US005761089A

United States Patent [19]

McInerny

[11] Patent Number: 5,761,089

[45] Date of Patent: Jun. 2, 1998

[54] COUNTERFEIT DOCUMENT DETECTION APPARATUS

[76] Inventor: George P. McInerny, 764 Madison Ave., Langhorne, Pa. 19047

[21] Appl. No.: 448,368

[22] PCT Filed: Feb. 25, 1994

[86] PCT No.: PCT/US94/01972

§ 371 Date: May 31, 1995

§ 102(e) Date: May 31, 1995

[87] PCT Pub. No.: WO94/19773

PCT Pub. Date: Sep. 1, 1994

Related U.S. Application Data

[63] Continuation-in-part of Ser. No. 22,145, Feb. 25, 1993, Pat. No. 5,430,664, which is a continuation-in-part of Ser. No. 913,224, Jul. 14, 1992, abandoned.

[51] Int. Cl.[6] .................. G06K 9/20

[52] U.S. Cl. .................. 364/550; 194/206; 194/213; 209/567; 382/320

[58] Field of Search .................. 194/206, 213; 235/449; 209/567; 364/550; 382/320

[56] References Cited

U.S. PATENT DOCUMENTS

| | | | |
|---|---|---|---|
| Re. 29,470 | 11/1977 | Jones | 235/925 B |
| Re. 33,847 | 3/1992 | DeBlasio | 271/3 |
| 2,731,621 | 1/1956 | Sontheimer | 340/149 |
| 2,827,167 | 3/1958 | Joseph et al. | 209/111 |
| 3,245,534 | 4/1966 | Smith et al. | 194/206 X |
| 3,253,709 | 5/1966 | Jenkins | 209/567 X |
| 3,280,974 | 10/1966 | Riddle et al. | 209/567 X |
| 3,509,535 | 4/1970 | Berube | 194/205 X |
| 3,771,783 | 11/1973 | McInerny | 271/125 |
| 3,857,559 | 12/1974 | McInenry | 271/122 |
| 3,870,629 | 3/1975 | Carter et al. | 209/567 X |
| 3,870,868 | 3/1975 | Jones | 235/925 B |

(List continued on next page.)

FOREIGN PATENT DOCUMENTS

| | | |
|---|---|---|
| 0115208 | 8/1984 | European Pat. Off. . |
| 0204574 | 12/1986 | European Pat. Off. . |
| 0206675 | 12/1986 | European Pat. Off. . |
| 0260940 | 3/1988 | European Pat. Off. . |
| 0276814 | 8/1988 | European Pat. Off. . |
| 0286378 | 10/1988 | European Pat. Off. . |
| 0295229 | 12/1988 | European Pat. Off. . |
| 0338123 | 10/1989 | European Pat. Off. . |
| 0366306 | 5/1990 | European Pat. Off. . |
| 0434232 | 6/1991 | European Pat. Off. . |
| 0451882 | 10/1991 | European Pat. Off. . |
| 0477711 | 4/1992 | European Pat. Off. . |
| WO9110902 | 7/1991 | WIPO . |

OTHER PUBLICATIONS

"Magnetic Counterfeit Detection Device Service Manual", Advanced Technics and System, S.A.

"Adaptive Feed Method", IBM Technical Disclosure Bulletin, vol. 35, No. 4A, Sep. 1992.

*Primary Examiner*—Edward R. Cosimano

*Attorney, Agent, or Firm*—Dann, Dorfman, Herrell & Skillman, P.C.

[57] ABSTRACT

A document processing apparatus incorporates a counterfeit detection system for identifying counterfeit suspect documents on the basis of the magnetic characteristics of the documents. Each document is transported within the vicinity of a magnetic read head, which produces an electronic signal in response thereto. The signal from the read head is conditioned by a conditioning circuit to be compatible with the analog-to-digital converter. The conditioning circuit includes one or more amplifiers, a filter, a rectifier, and an integrator. The conditioned signal from the integrator is provided to the analog-to-digital converter and is optionally limited to a compatible voltage level. As each document is detected a plurality of sample values are obtained by the analog-to-digital converter. The sample values are accumulated to produce one or more cumulative values representative of the document. The cumulative values are compared with one or more predetermined reference values associated with a genuine document in order to determine whether the detected document is counterfeit suspect document.

21 Claims, 17 Drawing Sheets

U.S. PATENT DOCUMENTS

| | | | |
|---|---|---|---|
| 3,912,155 | 10/1975 | McInerny | 271/80 |
| 3,982,107 | 9/1976 | Butler | 235/92 DN |
| 4,015,110 | 3/1977 | Jones | 235/925 B |
| 4,099,214 | 7/1978 | Jones | 361/31 |
| 4,114,804 | 9/1978 | Jones et al. | 235/476 |
| 4,146,218 | 3/1979 | Loftus et al. | 271/220 |
| 4,216,952 | 8/1980 | McInerny | 271/10 |
| 4,237,378 | 12/1980 | Jones | 250/223 R |
| 4,275,874 | 6/1981 | DeBlasio | 271/4 |
| 4,283,708 | 8/1981 | Lee | 382/7 |
| 4,313,598 | 2/1982 | DeBlasio | 271/125 |
| 4,326,636 | 4/1982 | Kawakami | 209/534 |
| 4,381,447 | 4/1983 | Horvath et al. | 250/223 R |
| 4,384,194 | 5/1983 | Jones | 377/8 |
| 4,406,996 | 9/1983 | Oka | 340/674 |
| 4,416,449 | 11/1983 | McInerny | 271/122 |
| 4,420,153 | 12/1983 | Winkler et al. | 271/304 |
| 4,443,006 | 4/1984 | Hasegawa | 271/10 |
| 4,490,846 | 12/1984 | Ishida et al. | 382/135 |
| 4,500,002 | 2/1985 | Koshio et al. | 209/534 |
| 4,500,084 | 2/1985 | McInerny | 271/35 |
| 4,504,916 | 3/1985 | Oka | 364/562 X |
| 4,574,190 | 3/1986 | Nishimura | 235/449 |
| 4,593,184 | 6/1986 | Bryce et al. | 235/449 |
| 4,608,704 | 8/1986 | Sherman, III et al. | 377/8 |
| 4,615,518 | 10/1986 | DeBlasio | 271/10 |
| 4,617,458 | 10/1986 | Bryce | 235/449 |
| 4,671,502 | 6/1987 | Sherman, III et al. | 377/8 X |
| 4,703,172 | 10/1987 | Sherman, III et al. | 271/4 |
| 4,707,599 | 11/1987 | Sherman, III et al. | 250/223 R |
| 4,709,820 | 12/1987 | Jenkins et al. | 209/534 |
| 4,737,627 | 4/1988 | Hughes et al. | 250/223 R |
| 4,741,526 | 5/1988 | Reed | 271/261 |
| 4,749,087 | 6/1988 | Buttifant | 209/534 |
| 4,761,002 | 8/1988 | Reed et al. | 271/111 |
| 4,764,725 | 8/1988 | Bryce | 324/234 |
| 4,790,526 | 12/1988 | Egashira | 271/315 |
| 4,796,878 | 1/1989 | Nichelson et al. | 271/10 |
| 4,818,871 | 4/1989 | Dupoy et al. | 250/308 |
| 4,837,426 | 6/1989 | Pease et al. | 235/449 X |
| 4,889,240 | 12/1989 | Sato et al. | 209/534 |
| 4,895,359 | 1/1990 | Ookawa | 271/125 |
| 4,906,842 | 3/1990 | Melcher | 250/205 |
| 4,906,988 | 3/1990 | Copella | 235/449 X |
| 4,909,149 | 3/1990 | Melcher | 101/232 |
| 4,922,110 | 5/1990 | Melcher | 250/556 |
| 4,931,779 | 6/1990 | Melcher | 340/674 |
| 4,944,505 | 7/1990 | Sherman, III | 271/265 |
| 4,985,614 | 1/1991 | Pease et al. | 235/440 |
| 5,005,688 | 4/1991 | Yukimoto et al. | 194/206 |
| 5,058,875 | 10/1991 | Stewart | 271/10 |
| 5,068,519 | 11/1991 | Bryce | 235/449 |
| 5,118,091 | 6/1992 | Nagamoto et al. | 271/122 |
| 5,295,196 | 3/1994 | Raterman et al. | 382/7 |
| 5,309,515 | 5/1994 | Troung et al. | 382/7 |
| 5,341,408 | 8/1994 | Melcher et al. | 377/8 |
| 5,377,805 | 1/1995 | Ono et al. | 194/206 |
| 5,430,664 | 7/1995 | Cargill et al. | 364/550 |
| 5,545,885 | 8/1996 | Jagielinski | 235/449 |

COUNTERFEIT DOCUMENT DETECTION APPARATUS

CROSS REFERENCE TO RELATED APPLICATIONS

This is a 371 of PCT/US94/01972, filed Feb. 25, 1994 which is a continuation-in-part of U.S. application Ser. No. 08/022,145, filed Feb. 25, 1993, now U.S. Pat. No. 5,430,664, which is a continuation-in-part of U.S. application Ser. No. 07/913,224, filed Jul. 14, 1992, now abandoned.

FIELD OF THE INVENTION

This invention relates to apparatus and methods for magnetic detection of counterfeit suspect documents.

BACKGROUND

Document counting and handling devices are known which count, verify and stack a particular type of document, such as currency. Among such devices are those that utilize analog comparator circuits to verify whether the optical and magnetic characteristics of a document falls within thresholds set by discrete electronic components which bias the comparator circuits. In order to adapt-such-devices for counting and verifying documents, which vary with respect to optical or magnetic properties, it is necessary to manually adjust the biasing components of the analog comparator circuits. However, the particular combination of verification tests that may be implemented in a document counting device of the prior art, which is adapted for one type of document such as United States currency, may not be suitable for another type of document, such as coupons, United States food stamps, or currencies of nations other than the United States. Accordingly, it would be desirable to provide a control system for a document counting apparatus in which verification tests can be selectively enabled and in which verification thresholds and procedures can easily be selected to conform to the characteristics or properties of a variety of documents.

It has been found that accurate verification of documents based on optical and magnetic properties of documents in a high-speed document counting device is complicated by the presence of electrical noise from a variety of noise sources within the counting device. In order to increase the reliability with which documents are verified as genuine, it would be desirable to provide a system for document verification which is essentially immune to the influence of such electrical noise.

SUMMARY OF THE INVENTION

In accordance with one aspect of the present invention, a document counting and batching apparatus is provided with a control system governed by a programmable microprocessor. The microprocessor is connected to a multi-channel analog-to-digital (A/D) converter which samples the analog signals from optical and magnetic document sensing devices. As each document is processed, the microprocessor accumulates a plurality of sample values from the sensors via the A/D converter. The accumulated sample values are compared with programmable thresholds and/or limit values in order to verify each document as it is transported through the apparatus. The threshold and limit values used to verify the magnetic properties of the documents are each selected by the user or easily reprogrammed for verification of different types of documents. Such reprogramming may, for example, be facilitated by replacement of a nonvolatile memory containing verification parameters and a control program executed by the microprocessor.

According to another aspect of the invention, the document counting apparatus incorporates a magnetic document verification system for documents having a magnetic property and the system incorporates features for reducing the influence of noise. The magnetic document verification system employs a magnetic read head for producing an induced electrical signal in response to the passage of a document having a magnetic property by the head. The magnetic head is rigidly mounted to a document guide plate. In one embodiment of the invention, a magnet for enhancing the magnetic property of the documents is also rigidly mounted in a fixed relationship to the magnetic read head to form a unitary mechanical linkage with the read head. As documents are transported along the guide plate, a path constricting roller positioned above the read head causes the documents to pass adjacent the magnetic read head at a uniform proximity thereto. A signal conditioning circuit processes the induced electrical signal from the read head to provide a conditioned signal having a low noise content. In a preferred embodiment, the signal, conditioning circuit includes a bandpass filter for removing both high and low noise components of the induced electrical signal from the magnetic read head. During the passage of a document past the magnetic read head, multiple signal samples of the processed signal are taken by an analog to digital converter to produce a value which is accumulated by a microprocessor. After the document has passed the read head, the accumulated value is averaged and compared to one or more predetermined reference values in order to verify the document as possessing predetermined or acceptable magnetic characteristics or properties.

In another embodiment of the invention, a document counting apparatus is provided with a counterfeit detection system that is adaptable for verifying documents having differing magnetic characteristics. Such documents, as the 50 Yuan note issued by the People's Republic of China, tend to have weaker and/or more localized magnetic characteristics than United States currency. In the detection and verification of relatively less magnetizable documents, an enhanced counterfeit detection system is provided with a high gain, low noise signal conditioning circuit for connecting the magnetic read head with the control microprocessor. As each document is transported past the read head, multiple signal samples of the conditioned signal are taken by an analog to digital converter under the control of a microprocessor. Each sample value is compared to one or more reference values and the microprocessor accumulates a count of the number of consecutive sample values which are within a predetermined range relative to the reference values. The accumulated count is, in turn, compared to one or more reference values associated with a genuine document to determine whether the processed document has an acceptable magnetic property.

BRIEF DESCRIPTION OF THE DRAWINGS

The foregoing summary, as well as the following detailed description of a preferred embodiment of the present invention, will be better understood when read in conjunction with the appended drawings, in which.

DETAILED DESCRIPTION OF THE PREFERRED EMBODIMENTS

Figure 1:
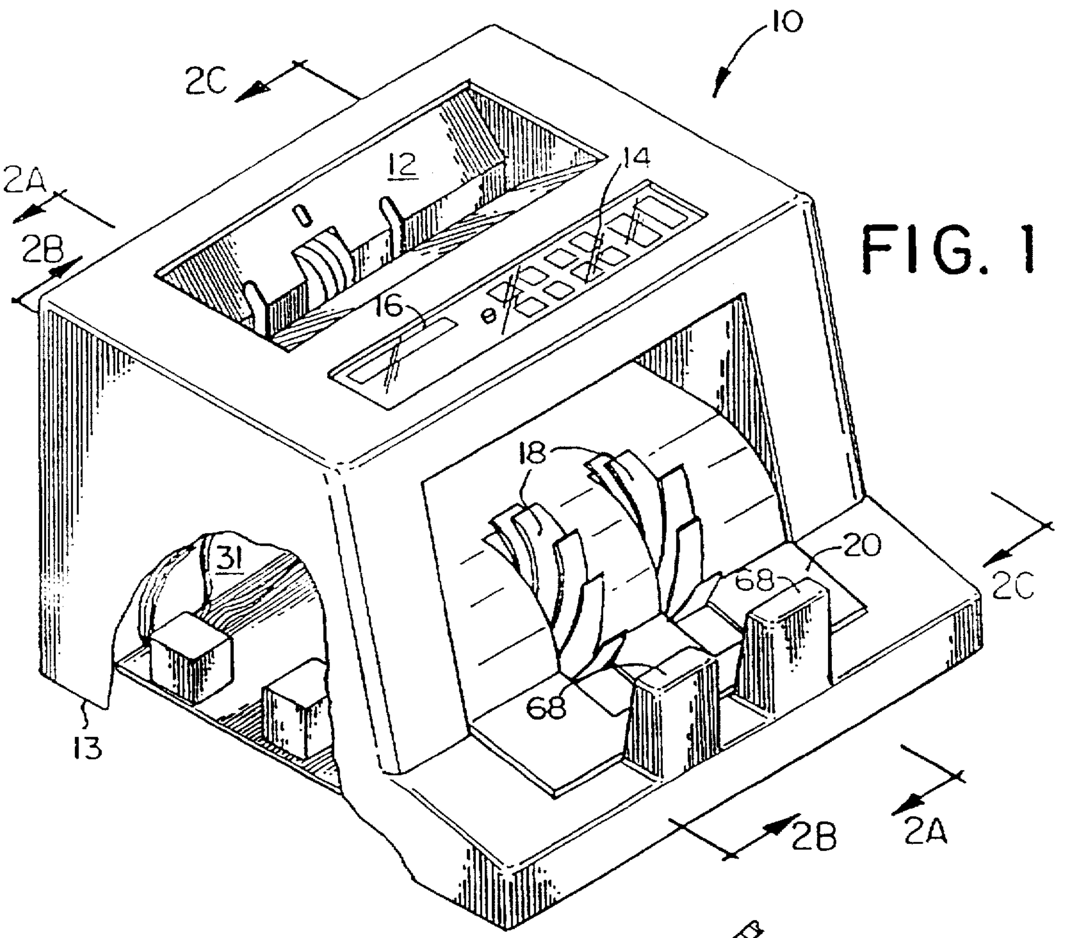
FIG. 1 is a perspective view of a document counting and batching apparatus in accordance with the present invention.

A document counting and batching apparatus 10 is shown in FIG. 1. In the apparatus 10, documents are placed into a hopper 12 whereupon they are fed into the apparatus 10 to be counted or batched. After passing through the apparatus 10, the documents are stacked by stacker wheels 18 onto a stacker plate 20. The apparatus has a control panel which includes a display 16, such as an LCD display, for presenting counting, total, and status information to the user. A keyboard 14 is provided for manually entering control commands to the apparatus.

Figure 2A:
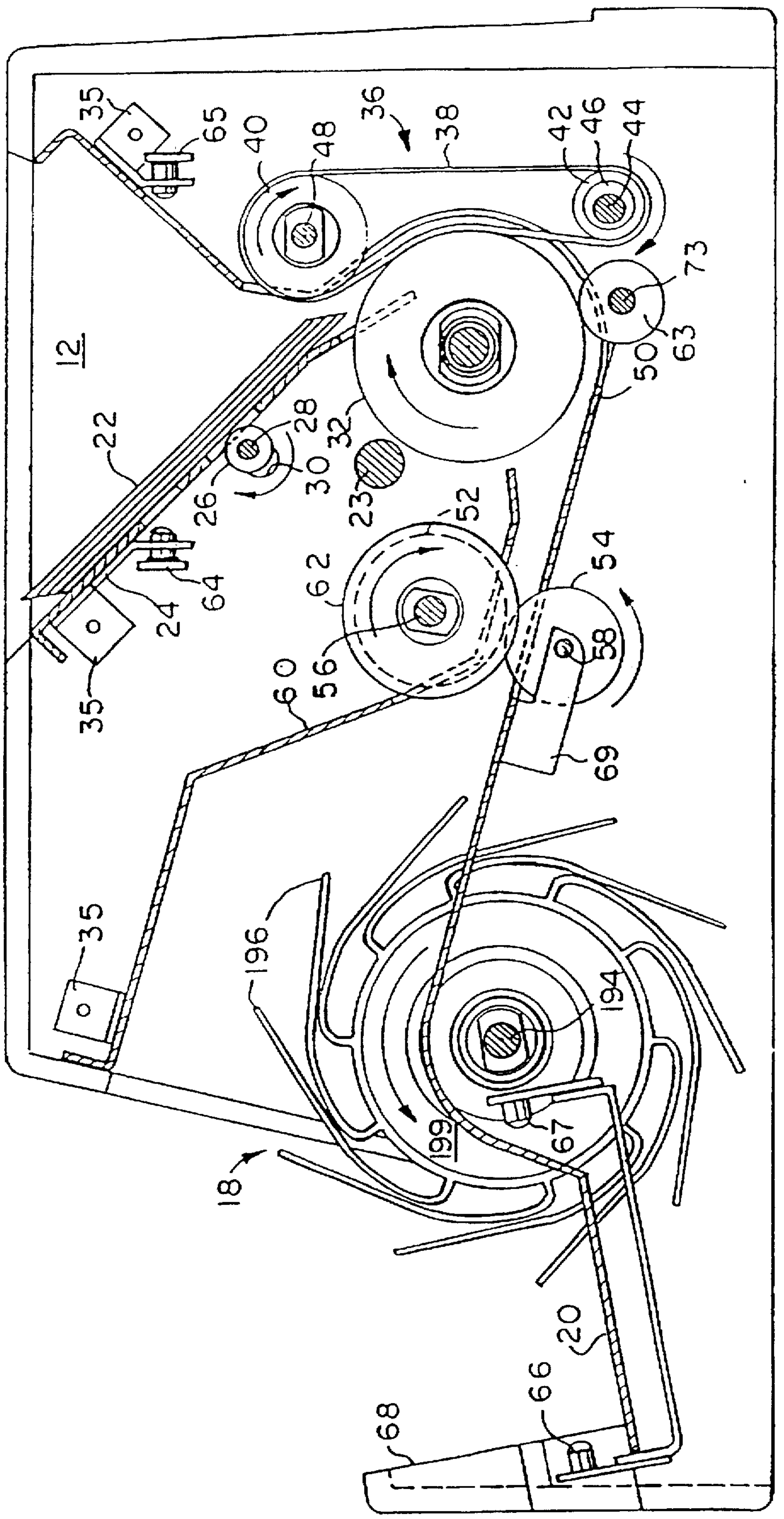
FIG. 2A is a cross-sectional diagram showing the arrangement of mechanical components of the document counting and batching apparatus of FIG. 1 along the line 2A–2A of FIG. 1 with parts broken away.
Figure 2B:
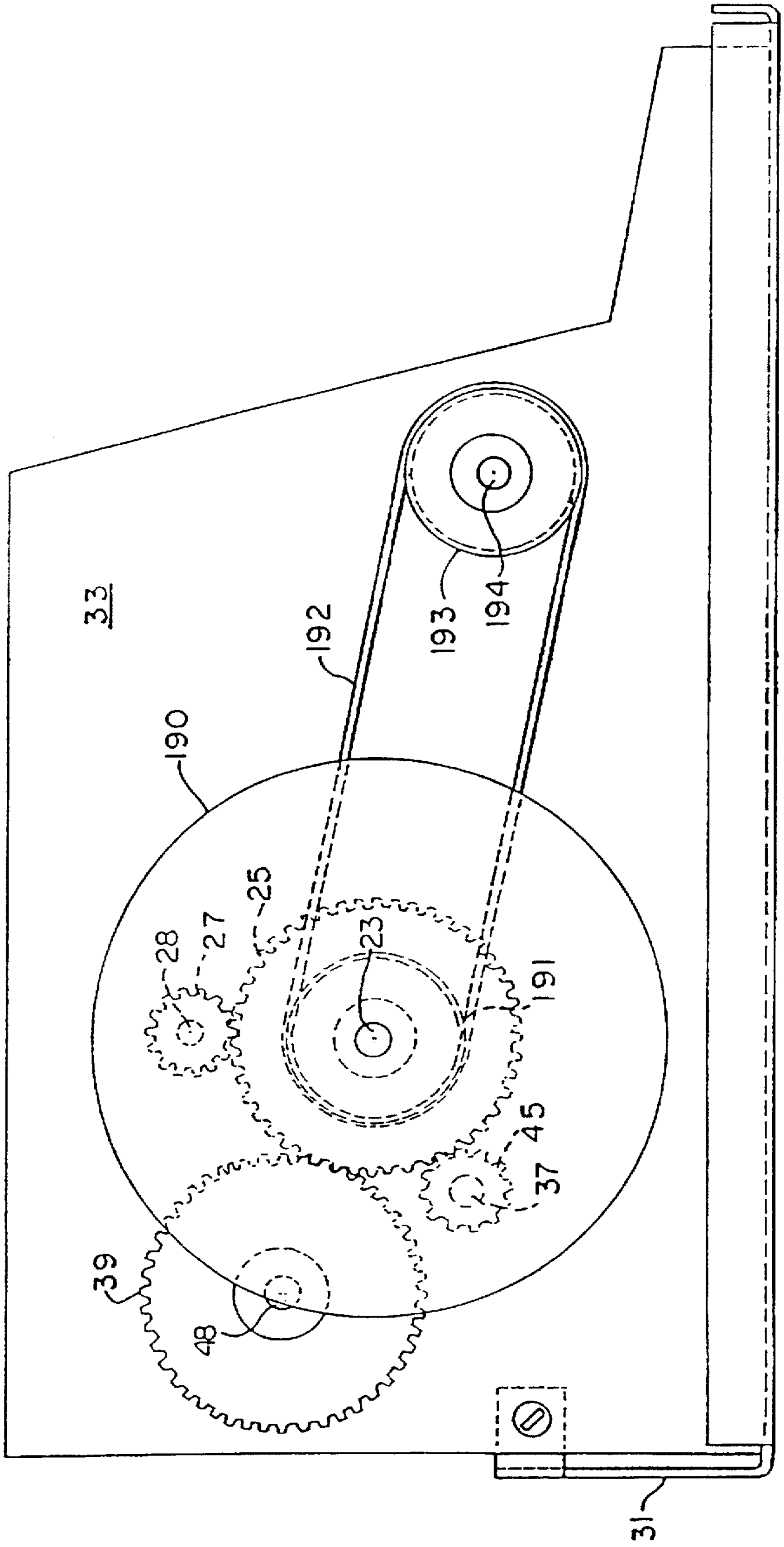
FIG. 2B is a side elevation view of the document counting and batching apparatus of FIG. 1 with the housing removed, taken along the line 2B of FIG. 1.
Figure 2C:
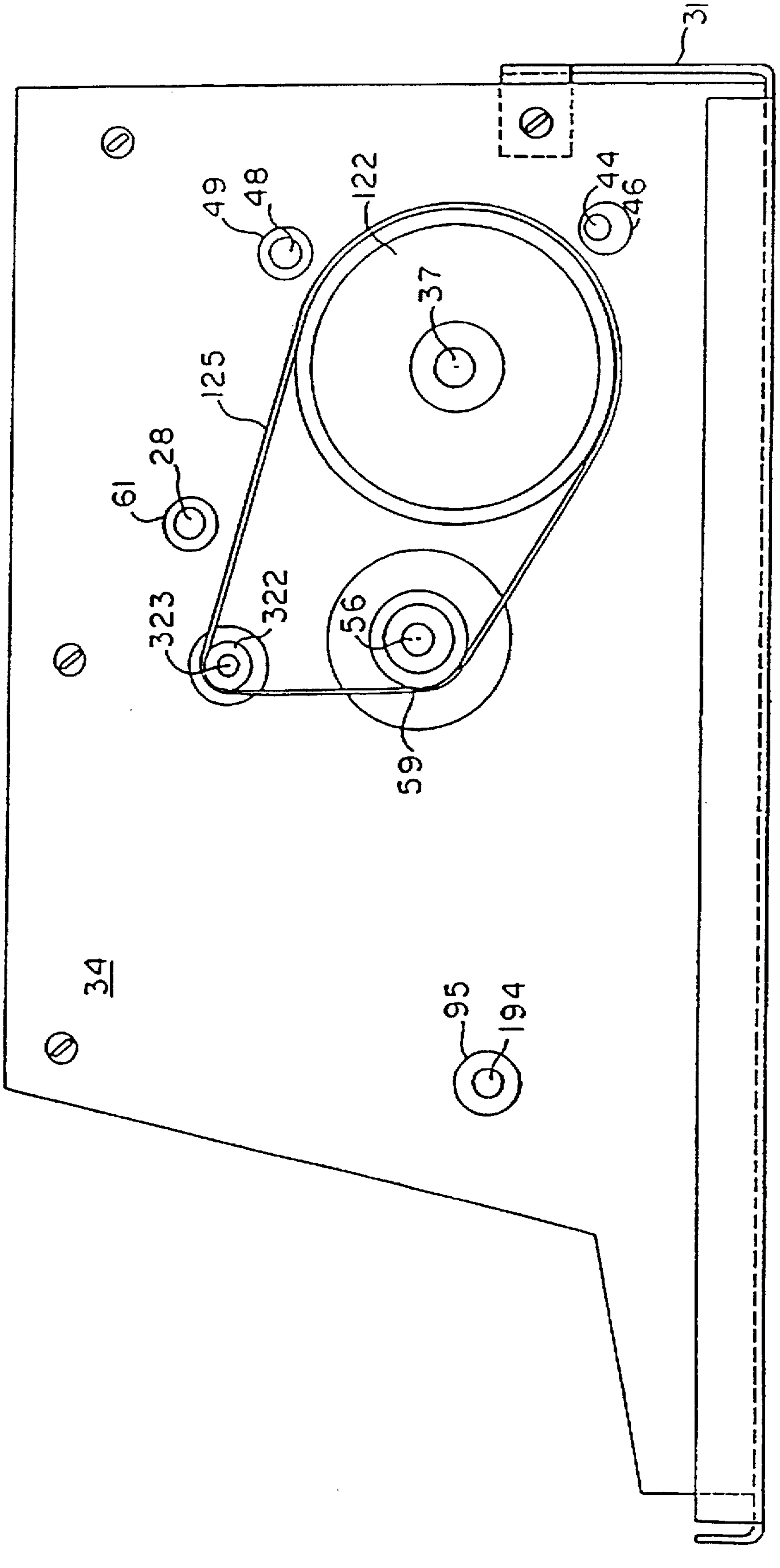
FIG. 2C is a side elevation view of the document counting and batching apparatus of FIG. 1 with the housing removed, taken along the line 2C of FIG. 1.

In regard to the document transport mechanism, referring now to FIG. 2A, a stack of documents 22 is shown placed into the hopper 12 and resting on a hopper plate 24. An LED 65 and photosensor 64 are aligned across the hopper 12 to detect the presence of documents within the hopper 12. A pair of picker rollers, of which picker roller 26 is typical, are mounted upon a picker roller shaft 28 that is located beneath the hopper plate 24. A frictional picker surface 30 extends around a portion of the circumference of the picker roller 26. Upon rotation of the picker roller 26, the picker surface 30 extends through an aperture in the hopper plate 24, frictionally engages the lowermost documents 22, and urges them toward a feed roller assembly 32.

As the feed roller 32 frictionally engages the lowermost documents, a stripper assembly generally designated 36 provides a stripping action in a direction that is counter to the rotation of feed roller 32 so that the documents are shingled and fed through the apparatus one at a time as described more fully hereinafter. The stripper assembly 36 is driven by a drive shaft 48 on which is mounted a drive pulley 40. The drive pulley 40 engages a stripper friction belt 38 which rotates about the drive pulley 40 and an idler pulley 42 mounted on idler shaft 44. The stripper belt 38 is selected to have a lower coefficient of friction with the documents 22 than the peripheral surface of the feed roller 32 so that the stripping action does not overcome the feeding action of the feed roller 32.

It is often the case that the frictional characteristics of documents, such as currency, are dependent upon the age and condition of the documents and upon environmental characteristics, such as humidity. In order to provide adjustment of the stripping friction applied to the documents 22 as they are fed into the apparatus, the idler shaft 44 is provided with rotatable eccentric bearings 46, which may be rotated to adjust the position of the idler shaft 44 relative to the drive shaft 48. Such adjustment alters the tension within the stripper friction belt 38 and may be used to vary the normal force applied to the documents 22 by the stripper friction belt as the documents are fed into the apparatus 10.

Figure 3A:
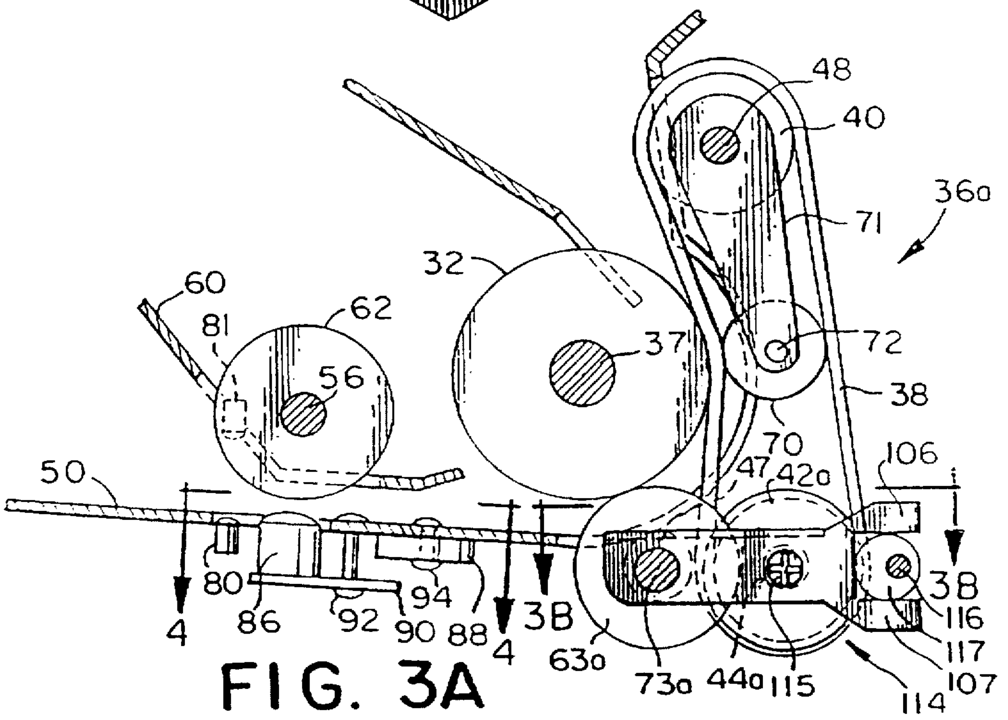
FIG. 3A is a partial cross-sectional diagram showing the location of optical and magnetic sensors within the document counting and batching apparatus of FIG. 2A and showing an alternate stripper assembly with some parts removed for clarity.

A preferred alternative stripper assembly generally designated 36a is shown in FIG. 3A. A tension idler roller 70 engages the stripper belt 38 between the drive pulley 40 and an idler collar 42a. The tension idler roller 70 maintains tension in the stripper belt 38 by preventing inward deformation of the loop formed by the stripper belt 38 as documents are urged toward the surface of the stripper belt 38. The tension idler roller 70 is mounted upon an axle 72 which is suspended from the stripper drive shaft 48 by a pivotally mounted bracket 71.

Figure 3B:
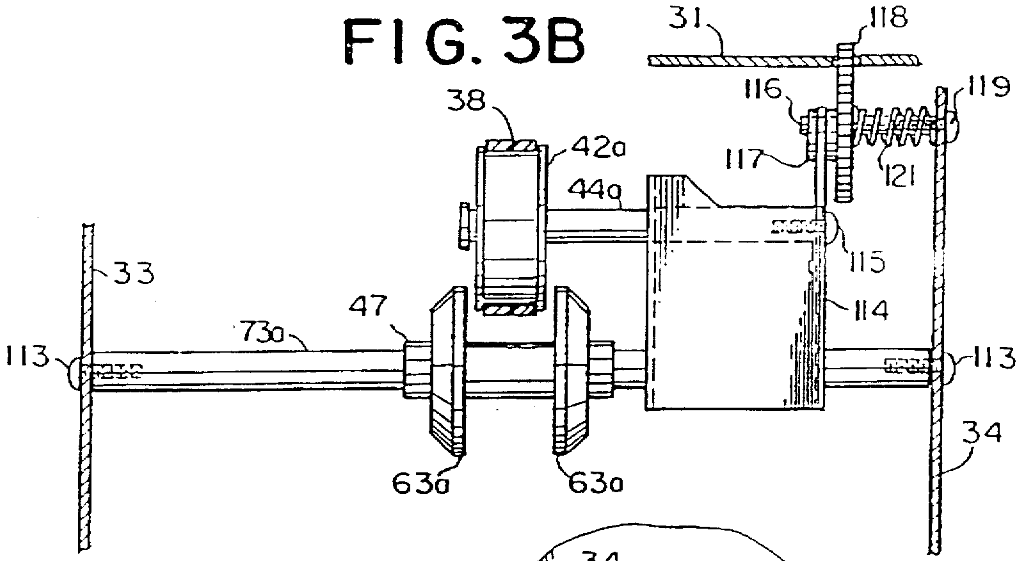
FIG. 3B is a plan view of the stripper adjustment mechanism of the stripper assembly of FIG. 3A taken along the line 3B–3B.

As can be seen in FIG. 3B, an idler collar 47 spins freely upon idler shaft 73a. The idler shaft 73a is fastened to the side plates 33 and 34 by screws 113. Returning to FIG. 3A, it can be seen that the surfaces of flanges 63a contact the surface of feed roller 32 so that documents remain in frictional contact with the feed roller and are advanced between the flanges 63a and the feed roller 32 along the guide path. Returning to FIG. 3B, there is shown a bracket generally designated 114 pivotally supported upon the idler shaft 73a. A stub shaft 44a is fixed to the bracket 114 by a screw 115 at one end of the stub shaft 44a. A tension adjusting pulley 42a is rotatably mounted upon the stub shaft 44a near the end of the stub shaft 44a opposite to the screw 115. As best seen in FIG. 3A, the tension adjusting pulley 42a engages the lower end of the stripper friction belt 38.

Figure 3C:
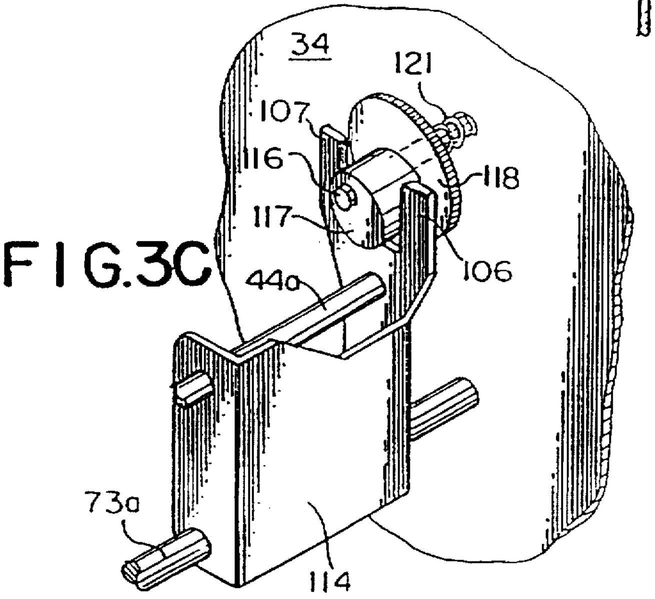
FIG. 3C is a perspective view of the stripper adjustment mechanism of FIG. 3A.

Turning to FIG. 3C, it is shown that the bracket 114 has a pair of jaws 106 and 107 at the opposite end of the bracket 114 with respect to the pivotally mounted end of the bracket 114 upon the idler shaft 73*a*. A cam 117 is eccentrically mounted on an adjustment shaft 116 between the jaws 106 and 107. As can best be appreciated from the view of FIG. 3A, rotation of the cam 117 upon the adjustment shaft 116 causes the jawed end of the bracket 114 to pivot about the pivotally mounted end of the bracket 114 upon shaft 73*a*. As the bracket 114 pivots, the stub shaft 44*a* may be moved vertically up and down by virtue of the mounting of the stub shaft 44*a* to the bracket 114. Vertical translation of the stub shaft 44*a* causes the pulley 42*a* to decrease or increase the tension in the stripper belt 38 as the pulley 42*a* is respectively moved up or down. Accordingly, it should be appreciated that the cam 117 is captured or held by the bracket to pivot the bracket about idler shaft 73*a*, and other arrangements, other than the jawed end, could be employed for capturing the cam by the bracket.

Returning to the view of FIG. 3B, it is shown that the adjustment shaft 116 is attached to the side wall 34 by a screw 119. Rotation of the cam 117 is preferably effected by rotating a thumbwheel 118 which rotates freely upon the adjustment shaft 116 and may be mounted to the cam 117 or formed of a single piece with the cam 117. The thumbwheel 118 preferably extends through a slot in the rear 31 of the apparatus for easy access thereto. When the stripper belt 38 is set to the desired tension, the position of the thumbwheel 118 is frictionally maintained by compression spring 121 which is mounted upon adjustment shaft 116 between the thumbwheel 118 and the side wall 34.

The functional relationships among the mechanical parts of the apparatus 10 may be appreciated from the views of FIGS. 2A–2D. A document guide plate 50, as shown in FIG. 2A, is connected to side plates 33 and 34 in a well known manner, such as by L-shaped brackets of which bracket 35 is typical. The picker shaft 28 is provided in journaled bearings 61 in side plates 33 and 34, with two pickers 26 thereon. The picker shaft 28 has a gear 27 thereon, which is engaged with an idler gear 25 on idler shaft 23, which is journaled in bearings 29 in plates 33 and 34.

The idler gear 25 is engaged with a stripper gear 39, on stripper drive shaft 48, which is journaled in bearings 49 in side plates 33 and 34.

The stripper drive shaft 48 has a centrally located stripper drive pulley 40 keyed thereto. A stripper friction belt 38 is engaged with drive pulley 40 and with an idler pulley 42 on an adjust shaft 44.

A tension idler roller 70 is mounted on a bracket 71, which is supported by and free to pivot on shaft 48 in a fashion similar to that shown in Technitrol U.S. Pat. No. 4,416,449 issued on Nov. 22, 1983, the disclosure of which is incorporated herein by reference.

The adjust shaft 44 is engaged with side plates 33 and 34 by eccentric bearing members 46, of well known type, which are rotatable and fixed in desired positions to impart a desired tension on stripper friction belt 38.

Figure 2D:
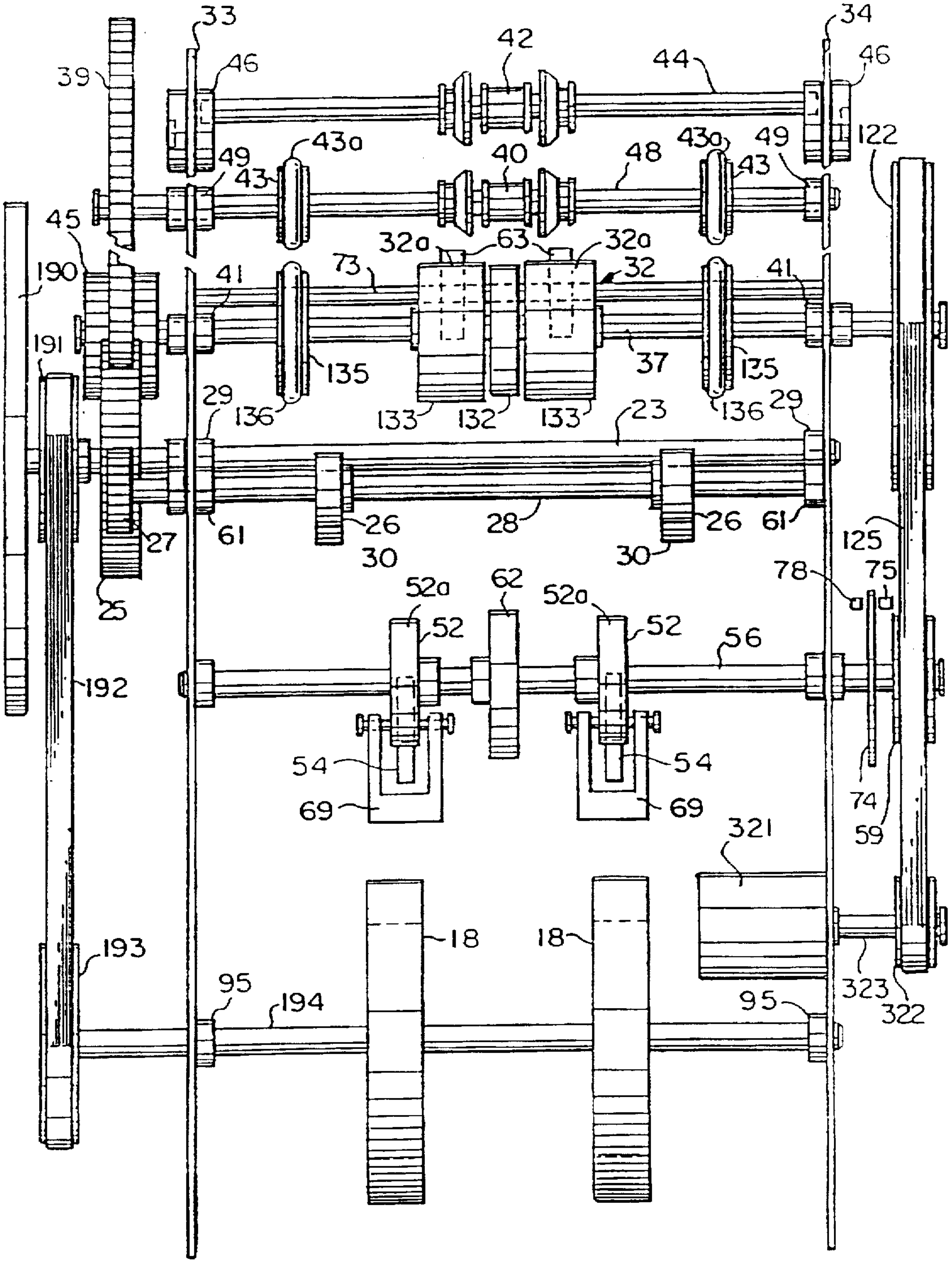
FIG. 2D is a diagrammatic plan view showing the drive train of the apparatus of FIG. 1 with the guide plates removed, the side plates broken, and overlapping parts separated for clarity.

The drive shaft 48 has a pair of pulleys 43 thereon, as shown in FIG. 2D, outboard from pulley 40 and keyed thereto, with O-rings 43*a* thereon for frictional engagement with the sheets of documents 22. The document guide plate 50 is slotted (not shown) to permit the O-rings 43*a* to contact the documents 22. The pulleys 43 are rotated counter to the direction that documents are fed into the apparatus so that the O-rings 43*a* provide additional stripping action.

The outer surface of the stripper friction belt 38 contacts idler collar 132 of the feed roller assembly 32 when there are no documents present between the feed roller assembly 32 and the stripper friction belt 38. The feed roller assembly 32 is keyed to feeder shaft 37, which is journaled in bearings 41 in side plates 33 and 34.

As shown in FIG. 2D, the feed roller assembly 32 includes central idler collar 132 and feeder pulleys 133 on each side keyed to shaft 37. The feeder pulleys 133 have outer friction linings 32*a* for frictionally engaging the documents as they are advanced by the pickers 26. The idler collar 132 rotates freely upon the feeder shaft 37 and the surface of the idler collar 132 is recessed relative to the feeder pulleys to accommodate the counter-rotation of the stripper friction belt 38.

The feeder shaft 37 has a pair of additional feed rollers 135, keyed thereto with O-rings 136 thereon, for frictional engagement with documents 22. The feeder shaft 37 has a gear 45 which is engaged with idler gear 25.

The feeder shaft 37 at its end opposite to gear 45 has a drive pulley 122 keyed thereto. A timing belt 125 is engaged with the drive pulley 122 and with a motor pulley 322 on output shaft 323 of a driving motor 321 mounted to side plate 34 as is best appreciated from the view of FIG. 2C.

The driving motor 321, shown in FIG. 2D, is of conventional type and connected by motor control circuitry as described hereinafter to a source of electricity (not shown).

The timing belt 125 is also engaged with a pulley 59 on an accelerator shaft 56, which is journaled in bearings in side plates 33 and 34. The accelerator shaft 56 has a pair of accelerator collars 52 thereon, which are keyed thereto and have smooth, outer gripping surfaces 52*a* to grip and accelerate documents, as described more fully hereinafter. A path constricting roller 62 is keyed to the central portion of the accelerator shaft 56.

The timing belt 125 is of the ridged type, which provides positive, non-slip driving between the motor 321 and pulleys 122 and 59.

A pair of accelerator idler rollers 54 are provided in contact with surfaces 52*a* of collars 52 and mounted upon an accelerator idler shaft 58. The accelerator idler shaft 58 is held by spring loaded carriage assemblies 69 which are mounted to the underside of the document guide plate.

The accelerator collars 52 and roller 54 grip each document and accelerates each document to provide a gap between the documents, and to feed each document sequentially to the stacker wheel 18. The path constricting roller 62 urges documents against a magnetic sensor, as described more fully hereinafter.

The accelerator shaft 56 has a timing disc 74 of well known type thereon, keyed thereto, and with an LED/photosensor pair 75 and 78 of well known type, such as the HOA1870-31 detector available from Honeywell mounted adjacent thereto. The photosensor 78 scans the timing disc 74, and provides a timing pulse to a central processor as described hereinafter for each predetermined incremental movement of the disc 74. The preferred incremental distance at which timing pulses are provided by the photosensor 78 upon movement of the disc 74 is equivalent to approximately one millimeter of movement of the surface of the acceleration rollers 52*a*.

The idler shaft 23 has an overrunning flywheel assembly 190 thereon, of well known type, which includes a pulley 191, of well known type, with a belt 192 engaged therewith and which pulley continues to rotate after shaft 23 is stopped by virtue of a conventional one-way clutch mechanism (not shown).

The belt 192 is engaged with a pulley 193 on stacker shaft 194, which is journaled in bearings 95 mounted in side plates 33 and 34.

The stacker shaft 194 has a pair of stacker wheels 18 keyed thereto which stack documents D on stacker plate 20.

The stacker wheels generally designated 18 have a drum portion 199, which is mounted to the shaft 194. The drum portion has a plurality of separated curved fingers 196 raised above and extending therefrom at an angle, the fingers receiving the documents from the accelerator collars 52 and stacking the documents one at a time on the plate 20.

The stacker plate 20 is also provided with a pair of separated vertically extending documents stops 68 against which documents are stacked.

Returning to FIG. 2A, it can be seen that after the stripping action on the documents, the documents are then advanced between the feed roller 32 and an idler roller 63 mounted upon an idler shaft 73. The idler roller 63 serves to maintain the frictional engagement of the documents with the surface of the feed roller 32 as the documents are advanced by the feed roller 32 toward acceleration roller 52 mounted upon acceleration shaft 56. The acceleration roller 52 forms a nip with acceleration idler roller 54 mounted upon acceleration idler shaft 58. Acceleration roller 52 and acceleration idler roller 54 increase the speed of the document to provide a spacing between documents advanced by the feed roller 32. Acceleration rollers 52 and 54 are positioned closely enough toward the feed roller 32 and the idler roller 63 along lower guide plate 50 so that documents are in continuous sequential contact with the nip between the feed roller 32 and the idler roller 63, the acceleration rollers 52 and 54, and then the fingers of the stacker wheel 18. Such continuous contact obviates reliance upon inertial drift of the documents to provide controlled transport through the apparatus.

After having been accelerated, documents continue along lower guide plate 50 toward the stacker wheel 18. The periphery of the stacker wheel 18 possesses a plurality of extended fingers 196 which lift documents from the lower guide plate 50 and place them upon the stacker plate 20. An LED 67 and a photosensor 66 are aligned across the stacker plate 20 to detect the presence of documents upon the stacker plate 20. The photosensors 64 and 66 may be photodiodes, phototransistors, or other equivalent devices.

Document Sensors

In regard to sensing the documents as the documents pass through the apparatus, several control and computational operations are carried out by an apparatus control network as documents pass through the apparatus. In order to provide an accurate count of acceptable documents, the apparatus incorporates means for detecting misfed documents or documents which do not satisfy predetermined fitness or authenticity criteria, collectively referred to hereinafter as error documents or counterfeit suspect documents. The apparatus is halted upon detection of a misfed or unfit document so that the user may remove the error document. A message indicating the type of error is shown on the display 16 upon detection of the error document. Misfeed error document include chains, which are partially overlapping documents, and doubles, which are completely overlapping documents. Chains are detected according to a length error which is generated due to their unusual length relative to other documents of the same type. Doubles are detected according to an opacity error which is generated due to their unusual opacity relative to an operator-selected range. Fitness error documents include documents of improper dimensions and suspected counterfeit documents. Referring to the dimensions of the document 100 shown in FIG. 4, a "half" error is defined as failure to exceed a predetermined length threshold in the direction of the X-axis and an "offwidth" error, sometimes referred to as a "short" error, is defined as failure to exceed a predetermined width threshold in the direction of the Y-axis, as indicated in connection with the document 100 in FIG. 4.

Figure 4:
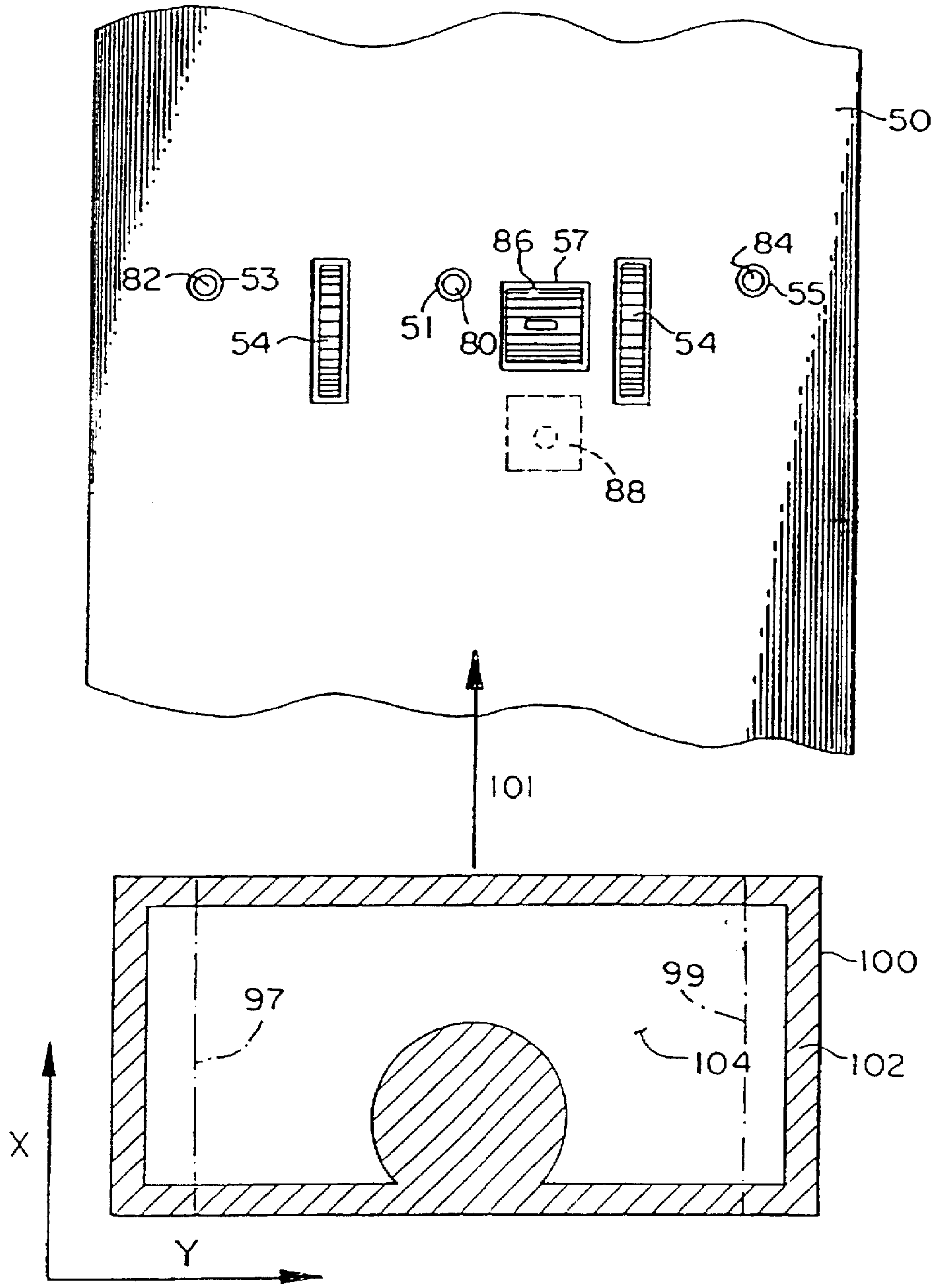
FIG. 4 is a sectional plan view of the guide plate showing the location of optical and magnetic sensors of FIG. 3 as viewed along line 4–4.

Several transducers are employed as part of the apparatus control system to sense characteristics of documents passing through the apparatus in the vicinity of acceleration rollers 52 and 54. As shown in FIG. 3A, a light source, such as center LED 81 is positioned above the lower guide plate 50 near the center of the document guide path. The center LED 81 emits light which is detected by an optical sensor such as center sensor 80 mounted beneath the lower guide plate 50 to provide optical detection of the presence of a document passing between the LED 81 and the sensor 80. As shown in FIG. 4, the center sensor 80 is mounted within an aperture 51 in the lower guide plate 50. A left sensor 82 is mounted within an aperture 53 located toward the left side of the lower guide plate 50. A right sensor 84 is mounted within an aperture 55 toward the right side of lower guide plate 50. The left and right sensor 82 and 84 are used to detect both the presence and the opacity of the left and right side segments (generally designated 99 and 97 by the lines in FIG. 4) of the documents sensed by the sensors, as the documents are transported along the lower guide plate 50 adjacent the sensors. The left sensor 82 and the right sensor 84 cooperate with respective left and right LED's 83 and 85 shown in FIG. 6A. The LED's 83 and 85 are mounted within the upper guide plate in an arrangement similar to that of center LED 81 and center sensor 80 described in connection with FIG. 3A. It is noted that the relative positions of LED's and phototransistors in the upper-and lower guide plates, respectively, may be reversed without affecting the detection of documents passing therebetween. It is further noted that light sources other than LED's and optical detectors other than phototransistors may alternatively be employed to obtain the detecting and sensing functions described herein. Lastly, it is noted that the left, right, and center photosensors are shown in FIG. 4 to be located on a line transverse or perpendicular to the guide path for the documents, although a different orientation of the sensors could be employed.

Magnetic sensing of the documents passing through the apparatus is also provided. Returning to FIG. **3*a*, a magnetic field detector, such as read head 86, is mounted upon a circuit board 90 beneath the guide plate 50 and positioned to protrude slightly above the surface of the lower guide plate 50. The read head 86 is preferably a single full-track head manufactured by Michigan Magnetics Inc. of Vermontville, Mich., having a nominal inductance of 300 mH, an impedance of 2 kΩ at 1 Khz, and a DC resistance of 270 Ω. The read head 86 provides an electrical signal indicative of the magnetic characteristics or magnetic property of documents proceeding along the lower guide plate 50. In order to intensify the induced electrical signal, a flux source, such as permanent magnet 88, is positioned below the lower guide plate 50 to magnetize documents prior to their passage above the read head 86**.

Mechanical vibration within the apparatus tends to introduce unwanted variations in the electrical signal at the read head 86, which may be due to vibrations inducing fluctuation in the relative positioning of the magnet 88, the read head 86 and the documents passing above the read head 86. In order to minimize vibration of the magnet 88 relative to the read head 86, the magnet 88 and the read head 86 are mounted in a rigid, fixed relationship to form a single mechanical unit. For example, in the preferred embodiment, the circuit board 90 is attached to the lower guide plate 50 by a rigid mounting, such as stud 92, and magnet 88 is also attached to the lower guide plate 50 by a rigid mounting, such as stud 94. Mounting both the read head 86 and the magnet 88 to the lower guide plate 50 constrains vibration or movement of the head 86 and the magnet 88 relative to each other. Alternatively, it is noted that the magnet 88 may be rigidly mounted to the circuit board 90 upon which the read head 86 is also mounted.

In order to minimize distance variations between documents and the read head 86, the path of the documents above the read head 86 is constrained by a path constricting roller 62 which is keyed to the accelerator shaft 56. The surface of the path constricting roller extends beneath the upper guide plate 60 to form a narrow gap in the vicinity of the read head 86. The narrow gap formed between the path constricting roller 62 and the read head 86 ensures that documents which pass over the read head 86 are substantially uniformly sensed or scanned by the read head 86 for accurate detection of counterfeit suspect documents. The path constricting roller 62 provides uniform magnetic sensing of documents without causing jamming of documents having curled edges as often occurs in prior art devices employing a stationary path constricting member to perform a similar function.

The position of the read head 86 relative to the optical sensors 80, 82, and 84 is shown in FIG. 4. The read head 86 protrudes through an aperture 57 in the lower guide plate 50 at a position that is slightly forward of the optical sensors 80, 82 and 84 with respect to the document transport direction as indicated by arrow 101. A document, such as a dollar bill generally designated 100, is transported along the lower guide plate 50 in the direction indicated by arrow 101. United States bills, such as bill 100, are characterized by a central non-magnetic portion 104 and a peripheral magnetic ink bearing portion 102. Thus, as the dollar bill 100 passes over the read head 86, the induced electrical signal produced by the read head 86 will be characterized by two periods of irregular activity indicative of the passage of the leading and trailing peripheral areas of the magnetic ink bearing portion 102 of the dollar bill 100.

Figures 5A, 5B:
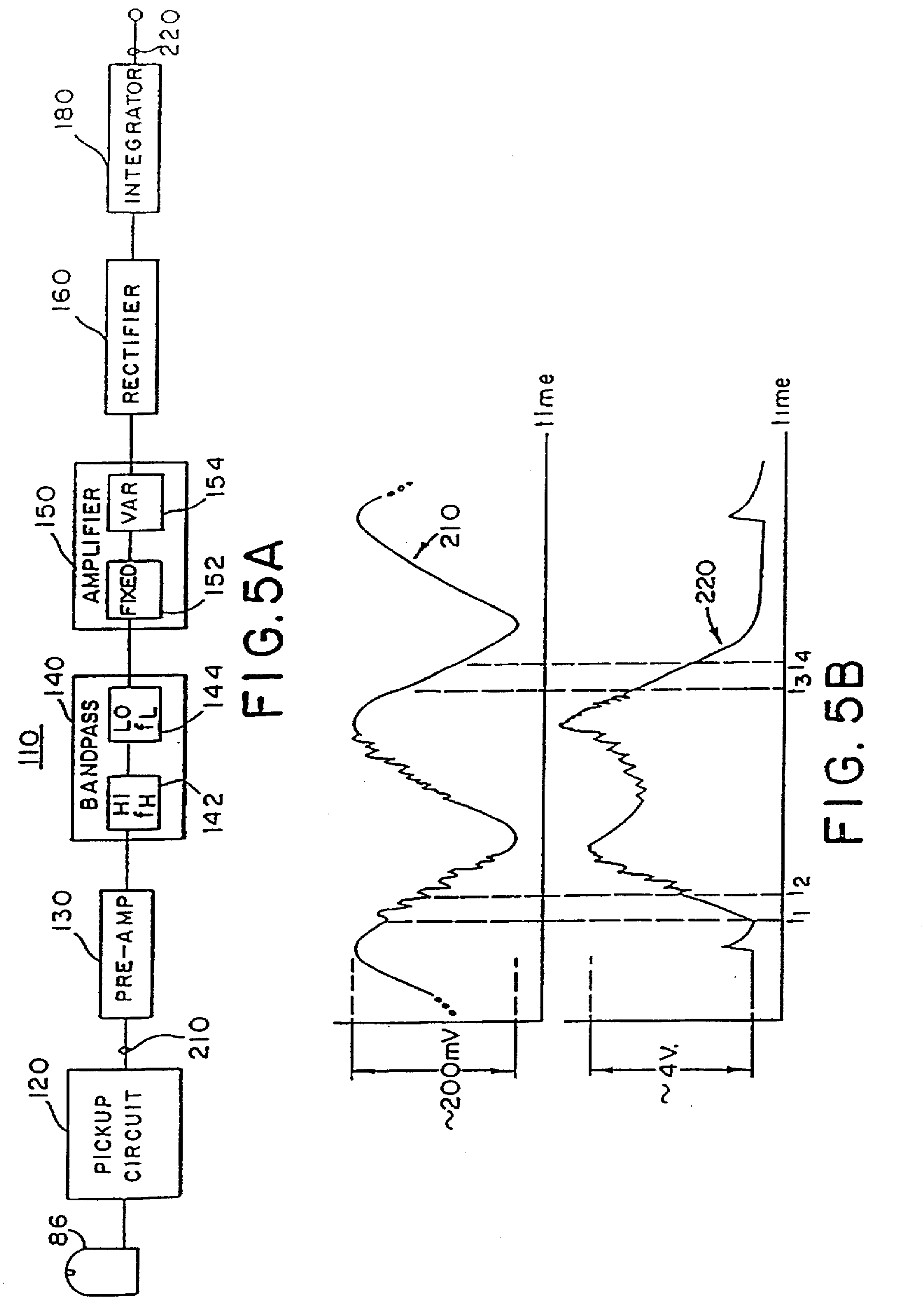
FIG. 5A is a schematic block diagram of a magnetic signal conditioning circuit in accordance with the present invention.
FIG. 5B is a graphical representation of the input and output waveforms of the circuit of FIG. SA.

The electrical signal generated by the read head 86 in response to the passage of a document is processed by a magnetic signal conditioning circuit 110 shown in FIG. 5A. The conditioning circuit 110 performs several signal processing functions to extract and amplify the component of the electrical signal from the read head 86 into a form suitable for analog-to-digital conversion. The read head 86 is connected to a pickup circuit 120. The pickup circuit 120 produces a pickup signal 210, a typical pickup waveform which is shown in FIG. SB. The pickup signal 210 is dominated by 60 Hz, 200 mv peak-to-peak leakage noise from the apparatus power supply. For clarity of exposition, noise components of signal 210 due to vibration and electronic noise from the motor are not shown. Time $t_1$ indicates time at which the leading edge of a document having a magnetic ink bearing periphery begins to pass over the read head 86. The pattern of ink upon the document causes a low-amplitude oscillation of the pickup signal 210 having frequency components significantly in excess of 60 Hz. The low amplitude oscillation exhibits a momentary decrease during passage of the non-magnetic portion of the document over the read head. After passage of the non-magnetic portion of the document, the low-amplitude oscillation is again present in the pickup signal 210. Time $t_3$ indicates the time at which the trailing edge of the document passes over the read head 86 and the low-amplitude oscillation ceases. The frequency content of the low-amplitude oscillation caused by passage of a document is significantly below the frequency range of vibration noise and motor noise. Returning to FIG. SA, the pickup signal 210 is passed to a pre-amplifier stage 130 which amplifies the pickup signal to a level suitable for extracting the low-amplitude oscillation caused by the magnetic ink bearing portion of the document. The preamplified signal is then passed to a bandpass filter 140. The lower and upper corner frequencies of the bandpass filter are selected to substantially eliminate the low frequency power supply noise and the high frequency vibration and motor noise from the preamplified signal. A pass band ranging from about 250 Hz to about 1600 Hz has been found to be suitable for this purpose. The bandpass filter 140 may be a single stage bandpass amplifier or a two-stage amplifier incorporating in series a high-pass stage and a lowpass stage.

Once the desired frequency range has been extracted by the bandpass filter 140, the filtered signal is passed to a second amplifier stage 150. The second amplifier stage 150 amplifies the filtered signal to a level suitable for analog to digital conversion and ultimately for threshold evaluation. The second amplifier 150 preferably incorporates both a variable gain stage 154 and a fixed gain stage 152. The variable stage 154 is provided so that the gain of amplifier 150 may be adjusted to compensate for a variation in the pickup signal amplitude. Such a variation may be induced by a change in the operating speed of the apparatus.

After having been amplified to a suitable level for digital conversion, the amplified signal is passed to a rectifier 160 which rectifies the amplified signal so that subsequent integration will produce a positive value. The rectified signal is then passed to an integrator 180 which integrates the rectified signal. The integrator is designed to have a finite integration time. The finite integration time of the integrator 180 reduces the sensitivity of the conditioning circuit 110 to momentary fluctuations of the rectified signal so that digital sampling of the integrated signal will yield a sample value that is representative of the magnetic characteristic or property of the document being sensed over a finite time period. The finite integration time of the integrator 180 also compensates for the time lag between magnetic and optical sensing due to the staggered relative positions of the read head 86 and the optical sensors 80, 82, and 84 along the lower guide plate 50. A further benefit obtained by the integrator is that the integrated signal does not fall to zero during the time that the non-magnetized portion of a document is present over the read head 86. The upper limit of acceptable integration time is determined by the temporal spacing between documents which are fed through the apparatus. The integration time must be short enough to allow the integrated signal to decay so that there is no carryover of integrated signal amplitude between successive documents. An integration time on the order of 2 ms has been found to be suitable for document counting speed of about 1200 documents per minute.

The integrated signal produced by the integrator is shown in FIG. 5B as conditioned signal 220. The conditioned signal 220 is characterized by two peak values of about 4V which are substantially concurrent with the passage of the magnetized peripheral portion of a document over the read head 86. As can be seen by comparison of the pickup signal 210 with the conditioned signal 220, the influence of the 60 Hz power supply noise is reduced to occasional spikes in the conditioned signal 220. The time period between $t_1$ and $t_3$ during which a document passes over the read head 86 is discernable by the large-scale rise and fall of conditioned signal 220. The time period during which the document is above the optical sensors 80, 82, and 84 occurs during the interval between $t_2$ and $t_4$. The optical detection interval lags slightly behind the magnetic detection interval between $t_1$ and $t_3$. The finite integration time of the integrator 180 ensures that the conditioned signal 220 maintains a significant positive amplitude concurrently with the optical detection interval.

Figure 5C:
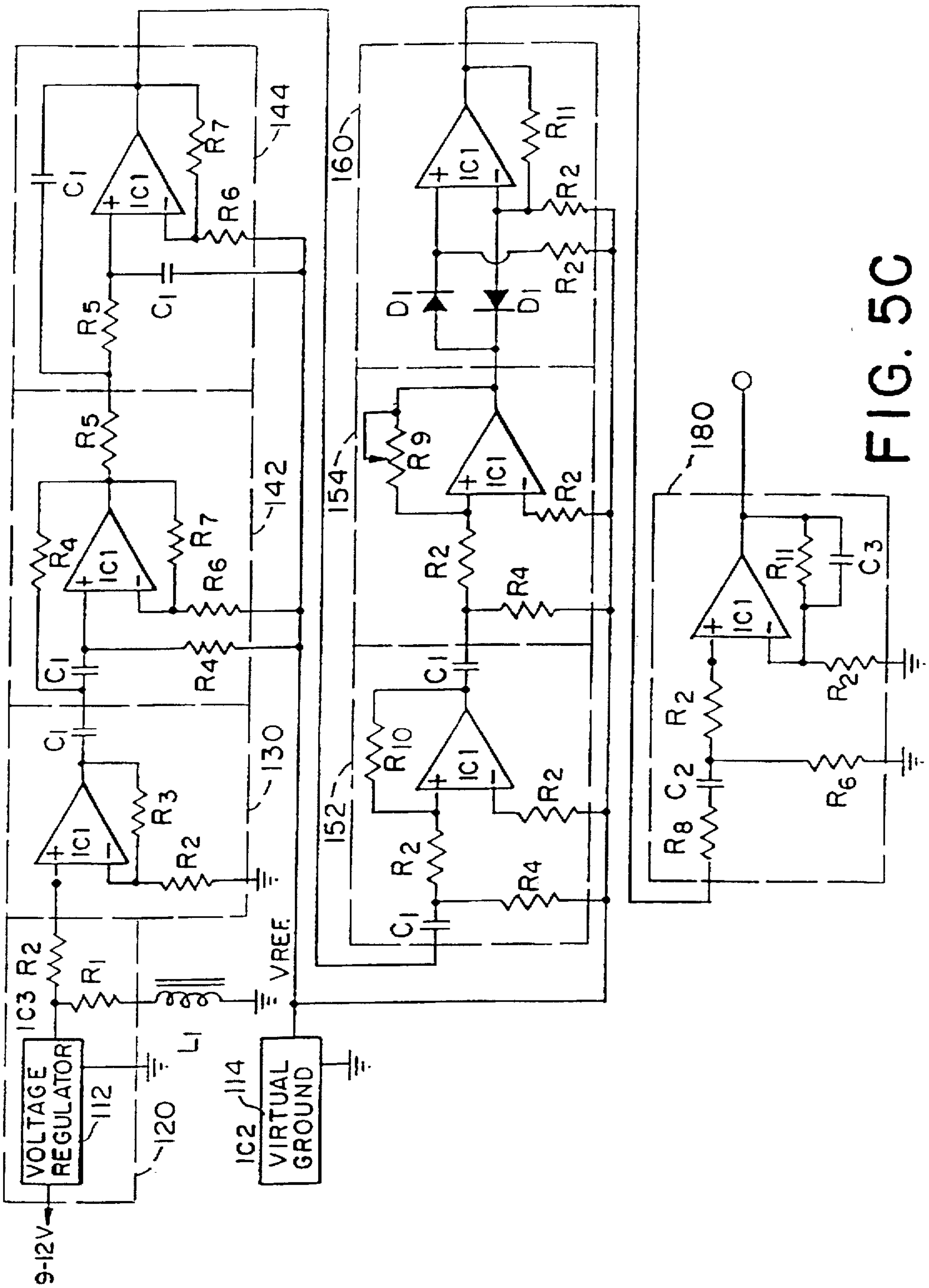
FIG. 5C is a schematic diagram of a preferred embodiment of the circuit of FIG. SA.

A detailed schematic circuit diagram of the conditioning circuit 110 is shown in FIG. 5C. The circuit 110 incorporates several linear operational amplifier stages preferably based upon LM324 op-amp circuits in order to accomplish the signal processing functions described in connection with FIG. 5B. The preferred component values pertaining to the conditioning circuit 110 are listed in Table I. The detailed operation of the conditioning circuit 110 shown in FIG. 5C will be apparent to those skilled in the art. To further enhance isolation from sources of electrical noise, a reference voltage is supplied from a virtual ground, such as a TLE2425 virtual ground, to the bandpass filter stages 142 and 144, amplifier stages 152 and 154, and the rectifier 160. The read head 86 is biased by a voltage regulator, such as an LM7805 5 volt DC regulator within the pickup circuit 120.

TABLE I

Signal Conditioning Circuit 110 Component Values

| | | |
|---|---|---|
| R1 - 20 KΩ | C1 - .01 μF | D1 - 1N914 |
| R2 - 10 KΩ | C2 - 1.0 μF | IC1 - LM324 |
| R3 - 330 KΩ | C3 - .10 μF | IC2 - TLE2425 |
| R4 - 75 KΩ | L1 - 300 Mh | IC3 - LM7805 |
| R5 - 10 KΩ | | |
| R6 - 47 KΩ | | |
| R7 - 27 KΩ | | |
| R8 - 220 Ω | | |
| R9 - 100 KΩ pot. | | |
| R10 - 1 MΩ | | |
| R11 - 100 KΩ | | |

Figure 6A:
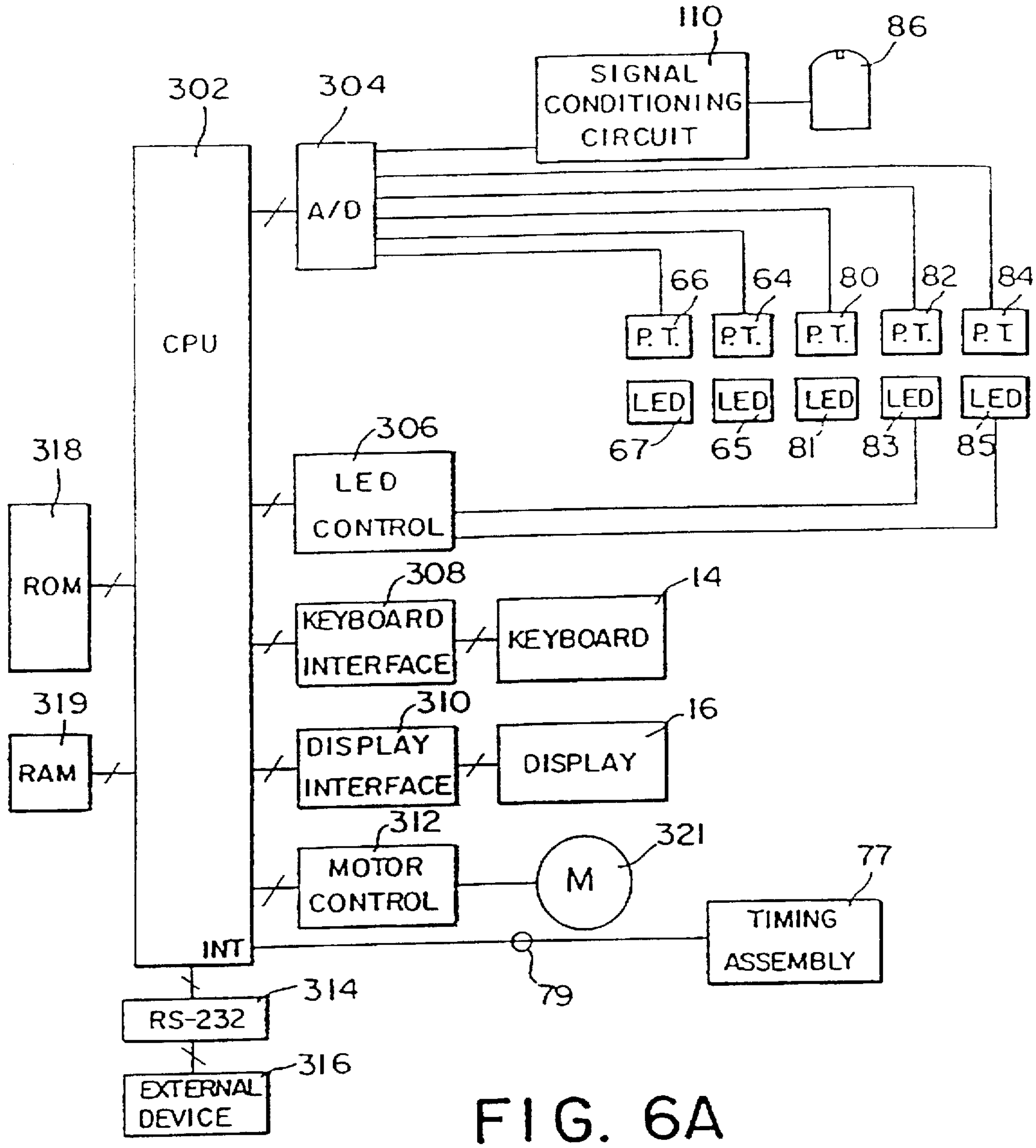
FIG. 6A is a schematic block diagram of a control system for the document counting and batching apparatus according to the present invention.

During the passage of a document through the document processing apparatus, the output signal 220, which is designated in FIGS. SA and 5B, of the signal conditioning circuit 110 is sampled and digitized for each incremental advance of the timing wheel assembly 77 by an analog-to-digital converter 304 shown in FIG. 6A. The digital values thus obtained are accumulated by a CPU 302 during a detection interval defined as the interval between $t_2$ and $t_4$ that the document is detected by the optical sensors. The digital values may be accumulated, for example, by a summation of the values obtained during the detection interval. Alternatively, the accumulated value may represent an average of the sample values or a comparable statistical measure of the digital values obtained during the detection interval.

After the detection interval ends at $t_4$, the accumulated value is compared to one or more reference values in order to verify that the accumulated value corresponds to the value for a genuine document having a predetermined or acceptable magnetic characteristic or property. For example, the accumulated value may be compared to reference values in the form of a lower threshold value and an upper limit value, which define a range of acceptable accumulated values according to which a document can be identified as an acceptable or genuine document. A procedure in which verification of magnetic characteristics may be carried out in conjunction with other functions of a document processing apparatus is described in more detail hereinafter in connection with FIGS. 7A–7D.

Figure 9:
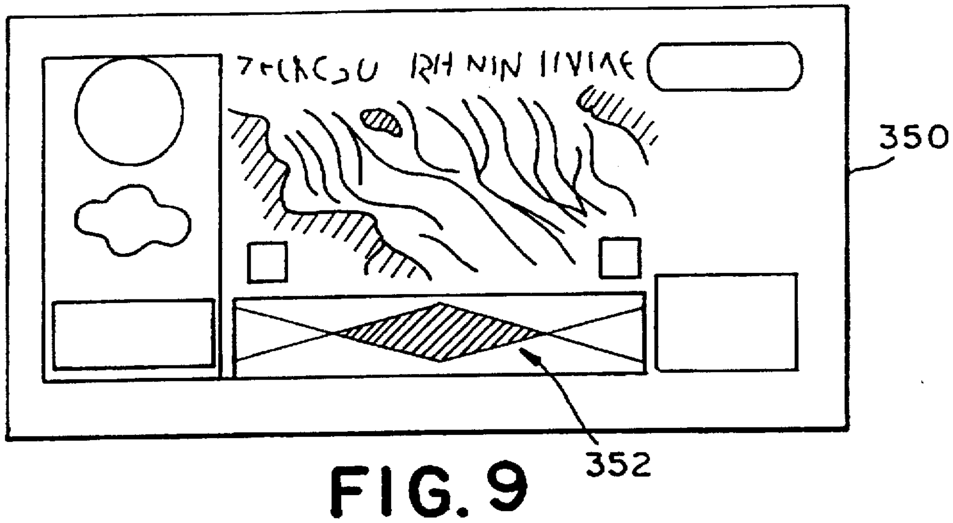
FIG. 9 is a diagram of the reverse face of a Chinese 50 yuan note with an indication of the location of the magnetic portion thereof.

It has been found that accumulating sample values corresponding to the magnetic characteristic of a document and then comparing a representative value to one or more reference values, is an advantageous method of verifying the authenticity of documents. This procedure is particularly advantageous when the examined document has sufficiently strong and/or spatially distributed magnetic qualities, which readily enables genuine documents to be reliably distinguished from counterfeit suspect documents. Some documents, which are desired to be examined, may have magnetic ink bearing portions that are relatively localized and/or weaker in their magnetic characteristics, as compared to U.S. currency. For example, as shown in FIG. 9, a 50 yuan note 350 issued by the People's Republic of China includes a relatively small area designated 352 in which ink with relatively strong magnetic properties is located. The ink upon the remaining portion of the 50 yuan note is relatively weak in regard to the magnetic properties thereof. The area designated 352 containing the ink with relatively strong magnetic properties is centrally located near the bottom of the reverse side of the 50 yuan note designated 350. The obverse face (not shown) of the 50 yuan note 350 also includes a limited area in which ink having relatively strong magnetic properties is present. Additionally, the magnetic ink used on the 50 yuan notes tends to have reduced magnetic properties than the magnetic ink used on United States currency. A practical result of such reduced magnetic characteristics for the ink on the 50 yuan note is that the signal conditioning circuit 110, as described in connection with FIGS. 5A–5C, will exhibit a reduced response relative to the response obtained in the processing United States currency. Hence, the electrical signal produced as a result of detecting the magnetic properties of a genuine 50 yuan note may not be reliably distinguished from electrical noise sensed during passage of a counterfeit 50 yuan note through the counting apparatus.

In order to reliably verify a document, such as the 50 yuan note, according to its magnetic characteristics, an enhanced magnetic sensing and conditioning system, which has higher gain and reduced susceptibility to noise relative to circuit 110 is preferably employed in the apparatus. Such an enhanced sensing and conditioning system is shown schematically in FIGS. 10A and 10B and includes read head 360 and conditioning circuit 110*a*. The preferred component values pertaining to the conditioning circuit 110*a* are listed in Table II.

TABLE II

Signal Conditioning Circuit 110a Component Values

| | | |
|---|---|---|
| R1 - 10 KΩ | C1 - 10 μF | D1 - 1N914 |
| R2 - 10 MΩ | C2 - .005 μF | D2 - 3.8 V Zener |
| R3 - 500 KΩ pot. | C3 - .1 μF | IC1 - LM324 |
| R4 - 75 KΩ | | IC2 - MAX680 |
| R5 - 150 KΩ | | |
| R6 - 47 KΩ | | |
| R7 - 100 KΩ | | |
| R8 - 3 KΩ | | |

Figures 10A, 10B:
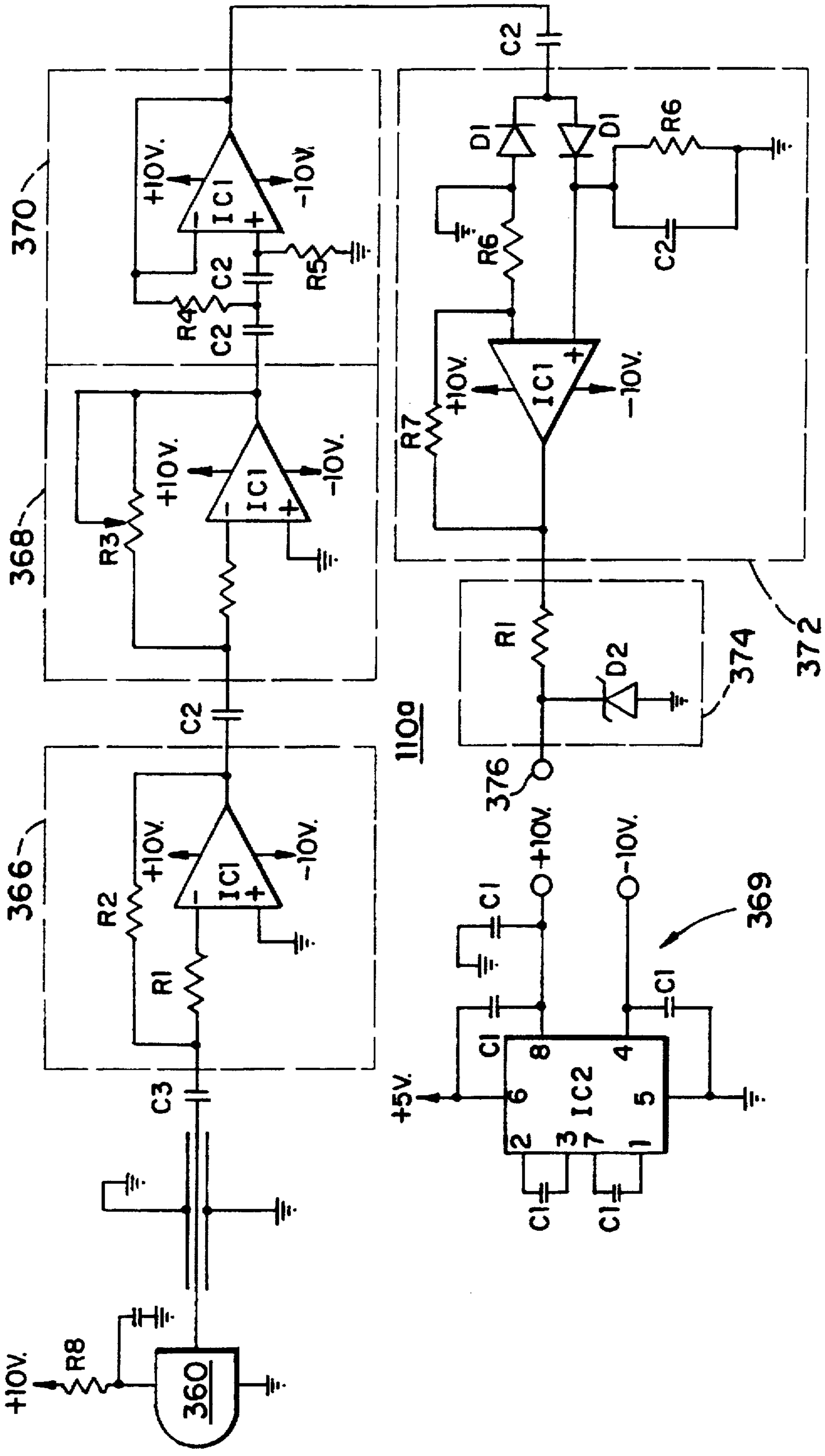
FIG. 10A is a schematic diagram of an alternative magnetic signal conditioning circuit in accordance with the present invention.
FIG. 10B is a schematic diagram of a power supply circuit for use with the circuit of FIG. 10A.

The read head 360 is mounted within the processing apparatus in a manner similar to that described in connection with read head 86 shown in FIG. 3A. Read head 360 is connected with a DC power supply as shown in FIG. 10B and provides a pick-up signal at line 362 in response to passage of a document having a magnetic property. The read head 360 is preferably a magnetoresistive transducer, such as a model BSO5N1HGAA currency recognition sensor manufactured by Murata Erie North America of Smyrna, Ga. The read head 360 does not require an external magnetic field to be applied within the document guide path, such as has been described previously in connection with permanent magnet 88. Since a separate magnet, such as magnet 88, is not needed, the influence of relative vibration between the read head 360 and such a separate magnet is eliminated.

In order to further reduce the influence of electrical noise, the signal conditioning circuit 110*a* is mounted within the apparatus at a location remote from the read head 360 and remote from the motor 321. The electrical signal supplied to line 362 is conducted through a shielded cable 364 to the signal conditioning circuit 110*a* at the remote location within the apparatus. The pick-up signal from line 362 is capacitively coupled to the conditioning circuit 110*a* and is received by a fixed-gain amplifier generally designed 366 in the conditioning circuit. The amplifier 366 preferably includes an LM324 operational amplifier that is connected with the bipolar 10 volt DC power supply circuit 369 shown in FIG 10B. The power supply circuit 369 preferably includes a MAX680 DC/DC charge-pump converter manufactured by Maxim Integrated Products of Sunnyvale, Calif. The dual 10 volt power supply is connected with amplifier 366 as indicated and is connected to other components within the signal conditioning circuit 110*a* thus allowing amplifier 366 to provide a greater variation of voltage in response to the pick-up signal relative to the comparable circuitry within conditioning circuit 110 (shown in FIG. 5A) utilizing a single-ended power supply. The bipolar DC power supply 369 can be conveniently operated with a 5 Volt DC signal that is compatible with logic circuitry employed elsewhere within the processing apparatus.

The amplified signal produced by amplifier 366 in response to the pick-up signal is capacitively coupled to the input of a variable-gain amplifier 368. The variable-gain amplifier 368 preferably includes a potentiometer R3 for adjusting the gain of the amplifier 368 to compensate for signals from documents having differing magnetic properties. For example, potentiometer R3 can be adjusted to provide a relatively low value of gain within amplifier 368 for processing U.S. currency. For processing Chinese currency, or other documents having relatively weak magnetic characteristics, potentiometer R3 can be adjusted to provide a relatively high value of gain. Alternative means for adjusting the gain of amplifier 368 may be employed in the practice of the invention, such as a gain selector switch arrangement, to provide the user with the ability to adapt the signal conditioning circuit 110*a* to the magnetic characteristics of particular types of documents being processed.

The output signal of the variable-gain amplifier 368 is provided to the input of a high-pass filter 370, which removes frequency components of the amplified signal that are below a predetermined frequency, such as below 300 Hz. The filtered signal from filter 370 is capacitively connected to a combined rectifier/integrator 372. The rectifier/integrator 372 provides rectification and integration of the filtered signal. The operation of rectifier/integrator 372 is similar to that previously discussed in connection with rectifier 160 and integrator 180 of circuit 110.

Since several of the stages of conditioning circuit 110*a* include operational amplifiers that are connected with the dual 10 volt power supply, it is possible that signals as high as 10 volts could be generated within the conditioning circuit 110*a* in response to documents with unusually strong magnetic characteristics or in response to transient signals. It is desirable to limit the conditioned signal produced by the signal conditioning circuit to a level below 10 volts so that the conditioned signal will be compatible with lower voltages used by the logic circuitry elsewhere in the apparatus. In order to limit the voltage provided at output terminal 376 of the signal conditioning circuit 110*a*, a clipping circuit 374 is connected between the rectifier/integrator 372 and output terminal 376 to limit the rectified and integrated signal. The clipping circuit preferably includes a zener diode D2 connected between terminal 376 and ground. The zener diode is selected to limit the voltage available at terminal 376 to a level, such as 3.8 volts or other desired voltage that is compatible with the reference level of the A/D converter that is to receive the conditioned signal from terminal 376. A resistor R1 is connected in series between the rectifier/integrator and the zener diode D2 in order to limit the current flowing within the diode D2 to an appropriate level.

Figure 11:
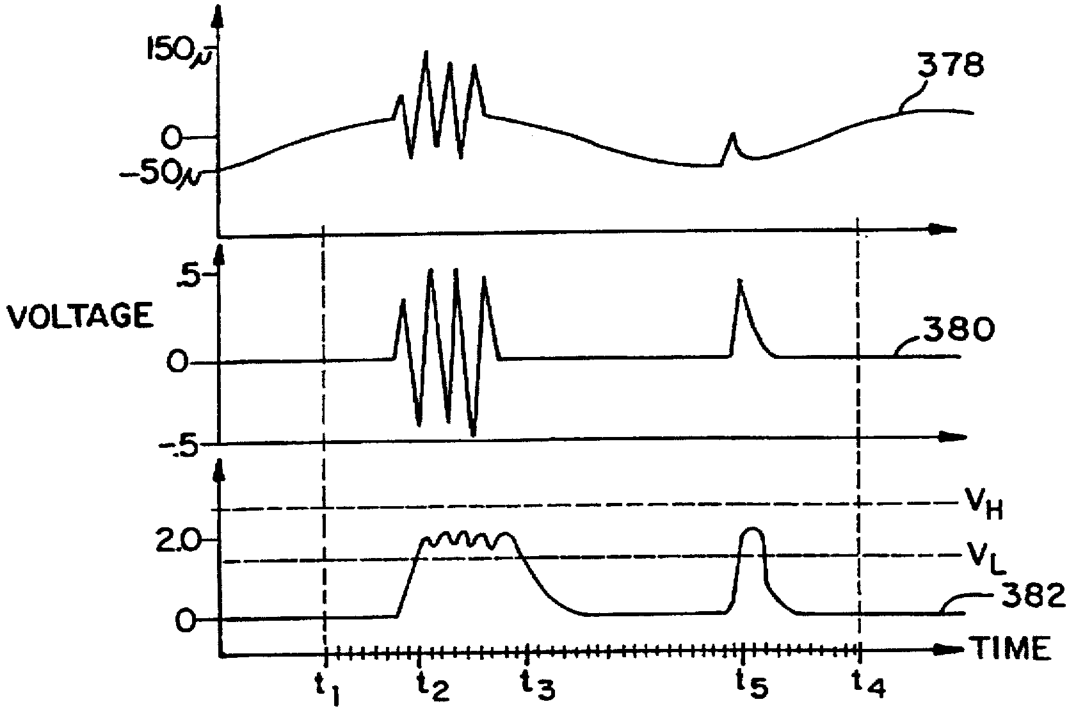
FIG. 11 is a graphical representation of signal waveforms produced by the signal conditioning circuit of FIG. 10A.

Referring now to FIG. 11, there are shown various voltage waveforms that are representative of the pickup signal designated 378 produced by the read head 360, the filtered signal designated 380 produced by the high pass filter 370 and the conditioned signal designated 382 that is received at output terminal 376. These signals are representative of those produced as a document, such as a 50 yuan note, passes along the document path guide. For clarity, noise components that are normally present within the waveforms have been eliminated from the waveforms shown in FIG. 11. Time $t_1$ indicates the time at which the leading edge of a document is detected within the guide path by the center photodetector. At time $t_1$, the pick-up signal 378 produced by the read head 360 exhibits a slight temporal variation due to coupling with the AC power supply of the processing apparatus. The 60 Hz frequency of the AC power supply is effectively blocked by the high-pass filter 370, thus filtered signal 380 and conditioned signal 382 are substantially flat at time $t_1$.

As the document continues along the guide path, the magnetic ink bearing portion passes the read head 360 causing the pick-up signal 378 to exhibit several high frequency oscillations having an amplitude of about 200 μV peak-to-peak. The high frequency oscillations are amplified by amplifiers 366 and 368 and are passed by high pass filter 370, which produces oscillations of signal 380 having an amplitude of about 1 V peak-to-peak. The oscillations of signal 380 are then rectified and integrated to produce a sustained pulse for the conditioned signal 382 having an amplitude of about 2 volts during the interval extending from time $t_2$ to time $t_3$. After time $t_3$, the magnetic ink bearing portion of the document has passed the read head 360, and hence, the waveforms 378, 380, and 382 exhibit no further significant sustained oscillations. At time $t_4$, the trailing edge of the document passes the center photodetector, thus concluding the document detection interval.

The signal conditioning circuit 110*a* may be used to verify documents in accordance with the method described herein in connection with signal conditioning circuit 110. Alternatively, the circuit 11*a* can be used in the practice of an alternative method described hereinafter.

As can be seen in FIG. 11, the interval between time $t_2$ and time $t_3$, during which the conditioned signal 382 exhibits a sustained pulse, is relatively brief compared to the total detection interval from time $t_1$ to time $t_4$ during which a document is sensed by the photodetector. The relatively brief nature of the pulse in the conditioned signal 382 between time $t_2$ and time $t_3$ imposes an upper limit on the range of accumulated values that can be obtained by sampling the signal 382 and summing the sampled values during the passage of genuine documents. The limited range of accumulated values, in turn, negatively influences the ability to make reliable distinctions between genuine documents and counterfeit suspect documents. Additionally, the relatively brief interval of activity in the waveforms associated with the passage of such documents renders the accumulation of sample values to be more sensitive to the influence of spurious signals relative to the processing of documents having stronger and/or larger magnetic ink bearing portions. For example, there is shown in FIG. 11 for the pick-up signal 382 a noise spike occurring at time $t_5$ during the detection interval. The resulting pulse in the conditioned signal 382 due to the spike at time $t_5$ would contribute significantly to the value of an accumulated sum of sampled values of waveform 382 taken at sampling intervals indicated by the ticks along the lower time axis of FIG. 11.

In order to overcome the aforementioned difficulties relative to the verification of documents having weak and/or highly localized magnetic characteristics, an alternative method of verifying documents can be used wherein a count is accumulated based upon the temporal characteristics of the conditioned signal 382. In the alternative method, a count, or accumulated value, is obtained by counting the consecutive sampling intervals during which the conditioned signal of the conditioning circuit 110*a* exceeds a predetermined lower threshold value, $V_L$, during the detection interval. The accumulated count is then compared to one or more reference values, associated with the duration of the pulse portion of a conditioned signal, that correspond with a genuine document.

Most preferably, the last-mentioned method for verification also includes the step of accumulating a count of sampling intervals during which the sampled value of the output signal of conditioning circuit 110*a* exceeds an upper limit $V_H$. In order to be identified as a genuine document, the count of sampled values above $V_H$ must be less than a predetermined maximum reference value and the count of consecutive sampled values above $V_L$ must be greater than a predetermined minimum reference value. The manner in which the alternative method may be carried out and combined with other functions of the document processing apparatus will be described hereinafter in connection with the logic flow diagram of FIG. 7E.

Control Network

Operation of the counting and batching apparatus is monitored and governed by a control network 301 as shown in FIG. 6A. A microprocessor, such as CPU 302, executes a control program stored in a non-volatile memory, such as ROM 318. The control program coordinates the functions of counting, batching, document testing, motor control, display control, user input, and communication with external devices. The CPU 302 is preferably a μPD78C10 manufactured by Nippon Electric Company. The CPU 302 is connected to a random access memory, RAM 319, having a number of registers for storing and retrieving information during execution of the control program. The RAM 319 may be an external RAM or may be monolithically integrated with the microprocessor. The CPU 302 is connected to a multichannel analog-to-digital (A/D) conversion circuit 304. In the preferred embodiment A/D circuit 304 is monolithically integrated with the CPU 302. The A/D circuit 304 receives analog signals from the sensors 66, 64, 80, 82, and 84, and from the magnetic signal conditioning circuit 110 and provides to the CPU 302 digital signals that correspond to the various analog signals.

An LED control circuit 306 is connected between the CPU 302 and the LEDs 83 and 85. The LED control circuit is a multi-channel digital-to-analog converter which adjusts the brightness of the LEDs in response to signals received from the CPU 302. Variation of LED brightness levels is particularly important to the operation of the right and left sensor circuits 82 and 84 since those circuits are used to determine both the presence and the opacity of documents passing through the apparatus. The light level required for opacity testing can be much greater than the light level required for detecting the presence of a document. Since LED reliability decreases with increasing brightness, it is desirable to operate the left and right LEDs at a high level only when opacity data is required. The particular brightness level required to determine document opacity is dependent upon the type of document being counted or batched and it is therefore desirable to allow the user to specify the brightness level used. The LED control circuit 306 further provides the CPU 302 with the capability to switch the LEDs to the document detection brightness level when the apparatus is in a stopped condition.

A keyboard interface circuit 308 is connected to the CPU 302 and to the keyboard 14 for allowing a user to specify or modify operating parameters during execution of the control program. A display interface 310 is connected to the CPU 302 for driving the display 16 which provides count and status information to the user. An RS-232 interface driver 314 is also connected to the CPU 302 so that the counting and batching apparatus can interface with an external device 316. The external device 316 may be a general purpose computer that is programmed to communicate with the apparatus and control the apparatus according to a serial communication protocol. The external device 316 may alternatively be a printer, such as a thermal printer, for printing piece counts, denomination counts, and grand totals of dollar amounts of documents counted by the apparatus. The CPU 302 is programmed to discriminate between different types of external devices according to connectors or jumpers which are set on the serial interface of the external device. External I/O via the RS-232 interface 314 may be employed either to complement or to replace direct entry of user commands via the keyboard 14.

A motor control circuit 312 is connected to the CPU 302 and is used to provide programmed control of the motor 321. The motor control circuit may turn the motor on and off, or vary the speed of the motor, in response to signals from the CPU 302.

Figure 6B:
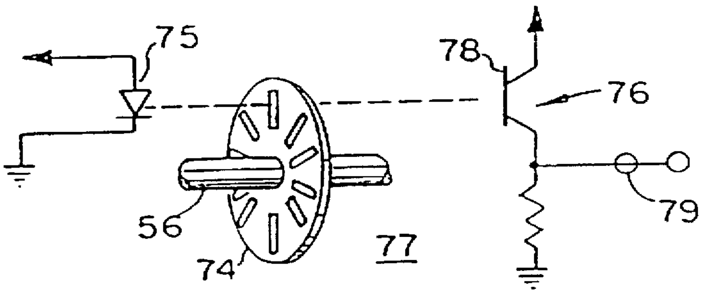
FIG. 6B is a schematic diagram of an electro-mechanical timing wheel for providing timing signals to the control system of FIG. 6A.

The CPU 302 includes an interrupt input INT which is connected via interrupt line 79 to a timing wheel assembly 77. The timing wheel assembly which is shown schematically in FIG. 6B provides timing signals to the CPU 302 for use in coordinating the counting and sensor data accumulation functions during the transport of documents through the counting and batching apparatus. The timing wheel 74 is mounted upon the accelerator shaft 56 so that the rotation of the timing wheel 74 is synchronized to the rotation of the acceleration roller 52.

The LED 75 and photosensor 78 are positioned on opposite sides of the timing wheel 74 as previously described and are aligned so that as the wheel 74 rotates, a sensor bias circuit 76 produces a pulse coincident with the passage of each radial slot between the LED 75 and the sensor 78. The output of the sensor bias circuit 76 is transmitted by the interrupt line 79 to an interrupt port of the CPU 302. Preferably, the number of radial slots in timing wheel 74 is such that approximately 66 interrupt pulses are generated as a document passes between the acceleration roller 52 and 54. In terms of distance, an interrupt pulse is generated by the timing wheel assembly for approximately each millimeter of circumferential revolution of the acceleration roller 52.

Figure 7A:
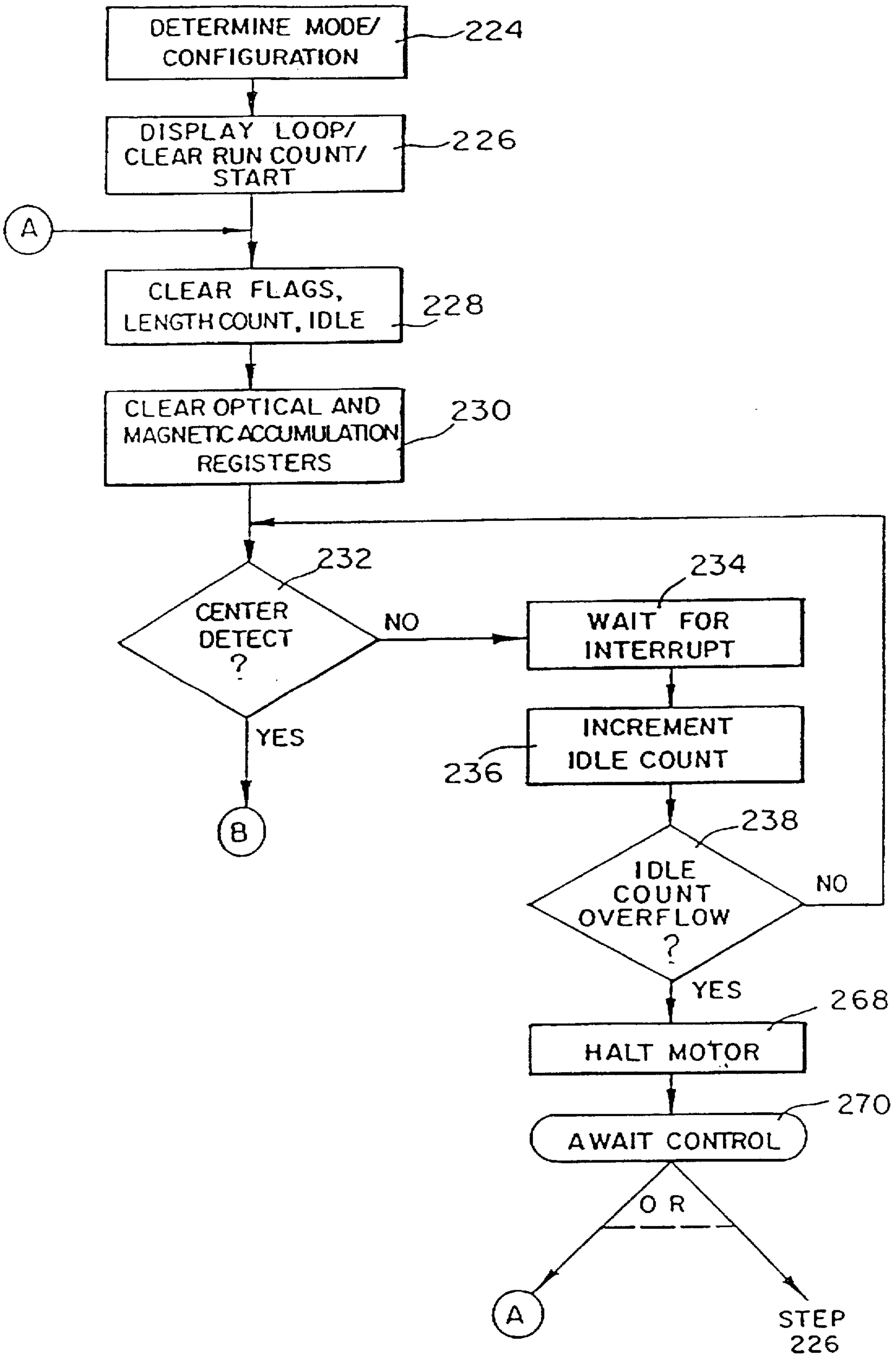
FIGS. 7A–7E are successive parts of a logical flow diagram of the control procedure executed by the control system of FIG. 6A, including alternative counterfeit detection procedures.

A preferred control routine for controlling operation of the apparatus is shown in FIGS. 7A–7D as a flow diagram. The control routine encompasses the functions of command I/O, sensor data accumulation, sensor data evaluation, and document counting. Referring to FIG. 7A, initial step 224 is executed to determine the operational mode and configuration of the apparatus. During step 224, the CPU determines whether an external device is connected via the RS-232 interface. If an external device is detected, the RS-232 lines are tested for the presence of jumpers indicating whether the external device is a computer with which the CPU 302 will interact or whether the external device is a printer to which the CPU 302 will send output only. It is noted that references within this specification to user input via the keyboard and output via the display are also applicable to input from the external device and output to the external device, if it was determined in step 224 that such an external device is detected as connected in the system.

In step 226 pertinent initialization selections, such as the denomination of documents to be counted, batch or counting mode selection, batch size, operating speed, and verification options are input to the control procedure. The user may also cycle through a display loop in step 226 to obtain displays of accumulated piece counts, denomination counts and/or totals. The accumulated counts and/or totals may optionally be printed on the printer or uploaded to the host if the apparatus is connected to such external devices via the RS-232 port. Requesting the display of the accumulated counts and/or totals causes the counts/and or totals to be updated according to a run count. The run count is a register in which is stored the number of documents counted since the most recent display request. The run count is reset subsequent to each total display request. Whenever the grand total value count is requested, the CPU 302 calculates the grand total value from the individual denomination counts which may be stored in RAM 319 or in internal CPU registers.

Also in step 226, several threshold values used for error detection may be selected either by user input or from data previously stored in ROM. The document opacity level may also be selected by the user during step 226. The selected opacity level determines the brightness level at which the left and right LEDs 83 and 85 are lit during opacity testing. Magnetic detection of counterfeit suspect documents and/or opacity evaluation may be enabled or disabled by the user in step 226. If counterfeit suspect detection (CFS) is chosen, the threshold value against which magnetic data will be compared is selected by the CPU according to the specified operating speed. Such selection is necessitated by the dependence of the magnitude of the electrical signal produced by the magnetic read head 86 upon the speed at which documents pass by or adjacent the read head 86. In the preferred embodiment, the user can select between a high operating speed, on the order of 1200 documents per minute, and a low operating speed, on the order of 600 documents per minute. The low speed option is provided so that the user may visually determine the presence of counterfeit suspect documents by watching the documents as they are counted. Such visual counterfeit suspect determination may complement or replace magnetic counterfeit suspect determination. It has been found that a document counting speed on the order of 600 documents per minute is sufficiently slow to enable visual verification of documents.

Figure 8:
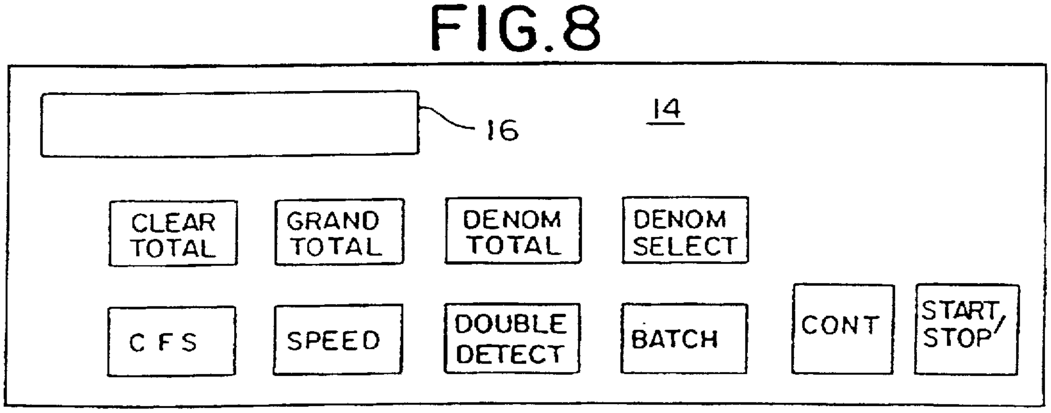
FIG. 8 is a plan view of the control panel of the apparatus of FIG. 1.

Initialization selections may be downloaded via the RS-232 interface or manually entered via the keyboard 14 which is shown in greater detail in FIG. 8. The keyboard 14 includes several switches by which the user may enter commands and select options as described in connection with step 226 of the control procedure. The keyboard 14 includes keys labeled START/STOP, CONT, BATCH, DENOM SELECT, DENOM TOTAL, GRAND TOTAL, CLEAR TOTAL, SPEED, CFS, and DOUBLE DETECT. The START/STOP key is a momentary switch which is pressed to start and stop operation of the apparatus. The CONT key is a momentary switch used to restart the counting and batching apparatus after the operation has been interrupted. Operation of the CONT key provides a signal to the counting and batching apparatus to restart operation and to continue the present count subsequent to detection and removal of a counterfeit suspect document or subsequent to operation of the START/STOP key. The DENOM SELECT key is used during step 226 of the control procedure to cycle through a list or menu to select that the denomination of bills to be counted in a particular run or to specify a piece count without regard to denomination. The DENOM TOTAL key is used to display accumulated totals of each denomination counted or the total piece count. The GRAND TOTAL key is pressed to display the sum of the accumulated dollar amounts of the individual denominations. The CLEAR TOTAL key resets the displayed accumulated total to zero. If CLEAR TOTAL is operated during display of the GRAND TOTAL, then all denomination totals are reset.

The CFS key is used during step 226 to toggle magnetic counterfeit suspect detection "on" or "off". The DOUBLE DETECT key is used during step 226 to select the LED brightness level for capacity testing or to disable opacity testing. The SPEED key is used during step 226 to select between the high operating speed and the low operating speed. The BATCH key is used during step 226 to select batch operation and the batch size. When selection of the initialization parameters in step 226 is completed, the motor is started and the control procedure then passes to step 228 upon depression of the START key.

In step 228, several variables pertaining to document testing are set to zero. As each document passes through the apparatus, the length of the document is measured by the count of timing pulses that occur while the center sensor 80 detects the presence of each document. The counting and batching apparatus is stopped if an unusually large number of timing pulses are counted while the center sensor is covered indicating the presence of a document. These two counts—the length count and the idle count—are reset in step 228 between the passage of each document. Two flags which are used to test for off-width documents—a right sensor flag and a left sensor flag—are also reset in step 228.

Proceeding from step 228 to step 230, several registers of RAM 319, which are used to accumulate document testing data, are reset. During the passage of each document, running totals of the left and right sensor signals, the magnetic signal conditioning circuit output, and the number of detected interrupt pulses are accumulated in respective registers of RAM 319. The totals stored in those registers are reset in step 230 between the passage of each document.

Proceeding from step 230 to step 232, the presence of a document is detected according to the value of the A/D channel corresponding to the center sensor 80. If the center sensor signal value is below a predetermined detection threshold, the control procedure branches to step 234 and waits for an interrupt pulse from the timing wheel. When an interrupt pulse is received in step 234, the control procedure continues to step 236 wherein the idle count is incremented. Then, in step 238, the idle count is compared to a predetermined limit. If, in step 238, the idle count does not exceed the limit, then the control procedure returns to step 232. If, in step 238, the idle count does exceed the idle limit, then control passes to step 268 wherein the apparatus is halted and then to step 270 wherein the control procedure awaits further input. From step 270, the control procedure may branch to step 226 upon receiving further initialization commands or the procedure may branch to step 228 upon detection of documents placed into the hopper. In general, the control path taken from step 270 is dependent upon the status condition which led to step 270 and the nature of the action taken by the user or the input from an external device.

Figure 7B:
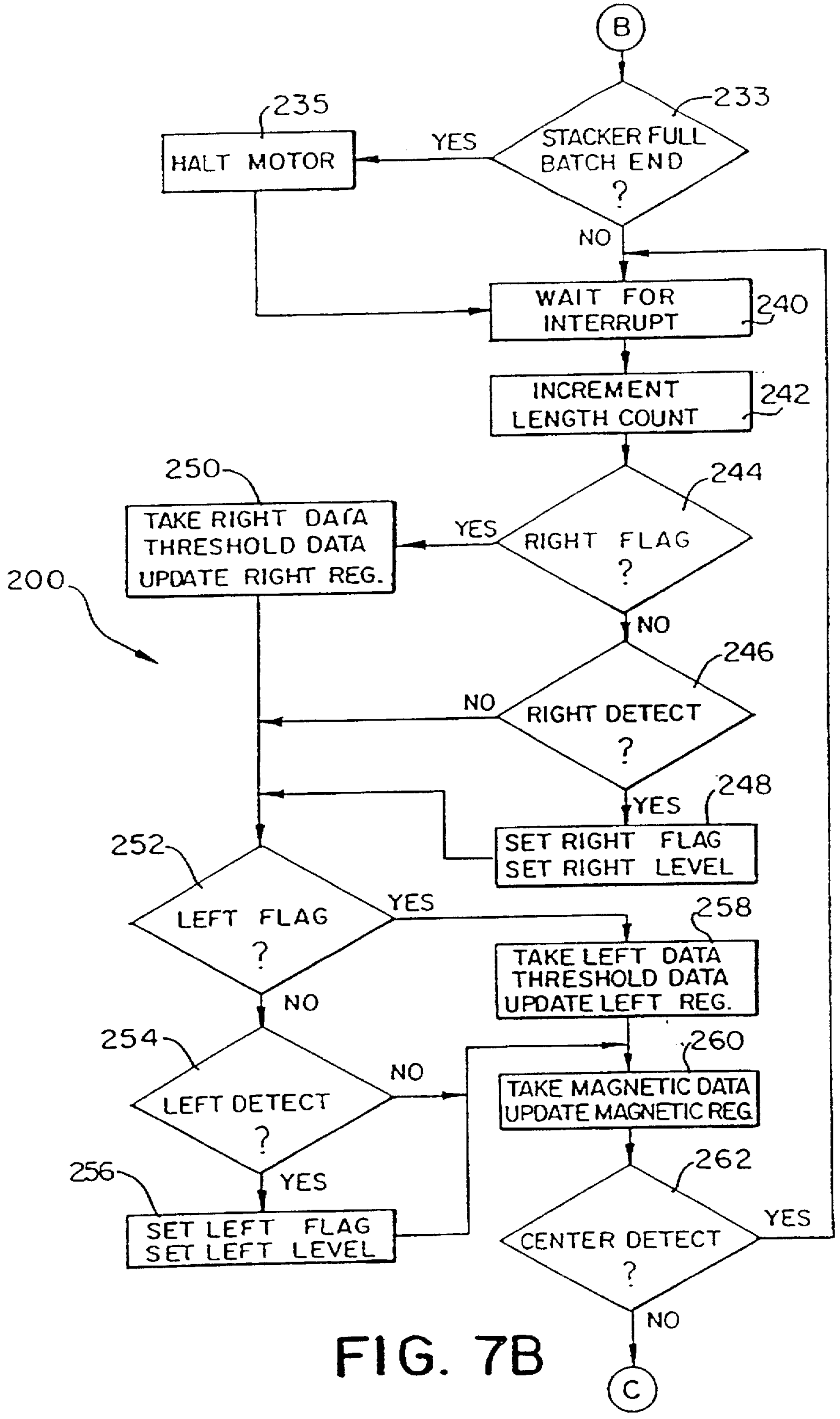
Figure 7C:
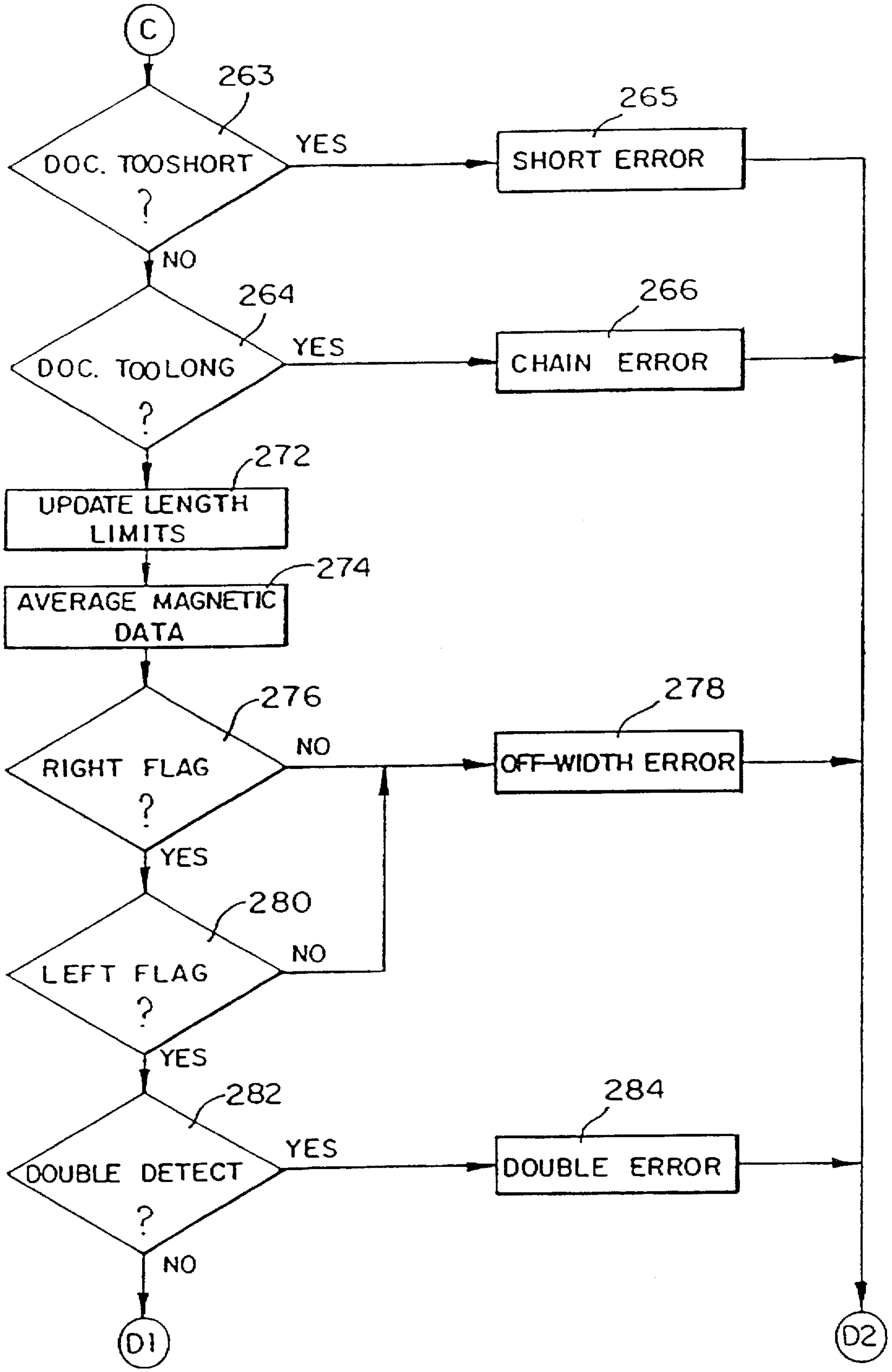

If, in step 232, the center document sensor does register the presence of a document, then the control procedure passes to step 233 of FIG. 7B as indicated by the continuation label B. In step 233, two conditions are tested to determine whether the motor should be halted. The first condition is whether the stacker count is has reached a value indicative of a full stacker less one document. Due to the high operating speed of the apparatus, the document transport mechanism cannot be instantaneously stopped. Consequently, if the stacker is about to become full, such a determination must be made when the leading edge of each document is detected. Likewise, if the apparatus is running in batch mode, a determination is made in step 233 whether the document presently detected by the center sensor would be the final document of a batch. If either of these two conditions are met, the control procedure passes to step 235 in which the motor control circuit begins to shut the motor down using a well-known dynamic braking technique. When the motor control circuit has begun to brake the motor or if neither condition was satisfied in step 233, then the control procedure passes to step 240.

Step 240 is the first step of a data accumulation loop 200 during which running totals of sensor data are generated as each document passes through the apparatus.

When an interrupt pulse is detected in step 240, the control procedure passes to step 242 wherein the document length count is incremented. From step 242, the control procedure passes to step 244. At step 244 a flag is checked which is indicative of the right sensor having previously detected a document. During the first iteration of the data accumulation loop 200, the right flag will not have been set and control will pass to step 246. In step 246, the A/D channel corresponding to the right sensor will be polled to sample the right sensor signal in order to determine the presence of a document along the right side of the lower guide plate 50. If a document is detected, the control procedure proceeds to step 248 wherein the right sensor flag is set and the brightness of the right LED is set by the LED control circuit 306 according to the opacity level selected in step 226 and the control procedure proceeds to step 252. If, in step 246, a document is not detected along the right side of the lower guide plate 50, then the control procedure proceeds directly to step 252 and the right LED remains at the document detection brightness level. Off-width document detection occurs when either the left sensor flag or right sensor flag is not set during the document data accumulation loop 200. Once the right sensor flag is set in step 248, then subsequent execution of step 244 will cause the control procedure to branch to step 250. In step 250, the A/D channel corresponding to the right sensor is sampled and accumulated in a register of RAM 319 and the control procedure passes to step 252. The opacity data which is taken A/D converter from the right sensor in step 250 typically exhibits considerable small-scale variation. In order to clearly delineate between a normal document and a more opaque document, such as a double document, the opacity data is preferably coarsely quantized into a few broad ranges which are numerically weighted so that the effect of small-scale opacity variation is reduced. Discrimination between single and double documents can be adequately accomplished using only four levels of opacity data quantization.

Beginning at step 252, a similar decision sequence is conducted for the left document sensor as was conducted for the right sensor in steps 244-250. If the left flag is found to be set in step 252, then the control procedure passes to step 258 wherein the left sensor level is measured, quantized, accumulated, and the control procedure proceeds to step 260. If, in step 252, the left flag is not found to be set, then the control procedure proceeds to step 254. In step 254, the left sensor is sampled and compared to a threshold to determine if a document is present at the left side of the guide plate. If a document is detected in step 254, then the control procedure proceeds to step 256 wherein the left flag is set. Also in step 256, the CPU 302 issues a signal to the LED control circuit 306 to increase the brightness of the left LED 83 to the opacity detection level selected in step 226. From step 256, the control procedure passes to step 260. If, in step 254, a document was not detected at the left photosensor, then the control procedure passes directly to step 260.

In step 260, the A/D channel corresponding to the output of the magnetic signal conditioning circuit 110 is sampled and accumulated. A control procedure then passes to step 262 wherein the A/D channel of the center sensor is again sampled to determine the presence of a document. If a document is still detected by the center detector, then the control procedure returns to step 240 to continue the data accumulation loop 200. When, in step 262, a document is no longer detected, then the data accumulation loop 200 is finished, and the control procedure branches to step 263 to begin a data evaluation phase of the control procedure shown in FIG. 7C as indicated by the continuation label C.

Beginning at step 263, the first of a series of tests is performed on the data accumulated during the data accumulation phase. It is noted that data evaluation tests can be made in other logical sequences than that shown in FIG. 7B. In step 263, the length count reached during the data accumulation loop 200 is compared to a length threshold value. If the length count is less than the length threshold, then the control procedure proceeds to step 265 in which the user is notified via the display 16 of a "half" error. From step 265 the control procedure passes as indicated by the continuation label D2 to step 267 shown in FIG. 7D wherein the run count is reset, and then it proceeds to step 269, wherein the motor is halted. Then, in step 271, the control procedure awaits a signal from the stacker photosensor that the documents have been removed from the stacker. If, in step 263 of FIG. 7C, the length count exceeds the lower threshold value, then the control procedure proceeds to step 264.

At step 264, the length count taken during the data accumulation loop 200 is compared to a length upper limit value. If the length upper limit value is exceeded by the length count, then a message indicating a chain error is shown by the display and/or output to the RS-232 port in step 266. From step 266, the control procedure passes as indicated by continuation label D2 to step 267 shown in FIG. 7D wherein the run count is reset and then proceeds to step 269, wherein the motor is halted. Then, in step 271, the control procedure awaits a signal from the stacker photosensor that the documents have been removed from the stacker. If, in step 264 of FIG. 7C, the length upper limit is not exceeded, the control procedure proceeds to step 272, wherein the length threshold and upper limit are updated according to a predetermined adaptation factor. The upper and lower length limits are preferably adjusted between each document to bracket the length of the most recently measured document by a predetermined proportion. Such proportional adaptation of the lower and upper length limits allows the apparatus to continuously adapt to variations of motor speed and/or minor variations in document length.

After the document length limits are updated in step 272, the accumulated magnetic data is divided by the length count to produce an average magnetic test value in step 274. The evaluation routine then proceeds to step 276 wherein the right flag is checked. If the right flag was not set during the data accumulation loop 200, then the routine proceeds to step 278 wherein the user is informed, by an appropriate display, of an offwidth document error. From step 278, the control procedure passes as indicated by continuation label D2 passes to step 267 of FIG. 7D, wherein the run count is reset and then to step 269 wherein the motor is halted. Then, in step 271, the control procedure awaits a signal from the stacker photosensor that the documents have been removed from the stacker. If, in step 276 of FIG. 7C, the right flag is found to be set, then the routine proceeds to check the left flag in step 280 with similar results (i.e. proceeding to step 278), if the left flag is found not to be set. If the left flag is set, the control procedure proceeds to step 282.

In step 282, the contents of the left and right opacity data accumulation registers are compared to their respective threshold values determined in step 226. If the count on either of the opacity data accumulation registers exceeds the respective threshold value, then the user is informed of an error, such as a double error, in step 284. From step 284, the control procedure passes as indicated by continuation label D2 to step 267 of FIG. 7D wherein the run count is reset and then passes to step 269 wherein the motor is halted. Then, in step 271, the control procedure awaits a signal from the stacker photosensor that the documents have been removed from the stacker. If in step 282 of FIG. 7C, the counts related to the accumulated opacity data registers are below the respective thresholds or if double detection was disabled in step 226, then the control procedure proceeds to step 286 of FIG. 7D as indicated by continuation label D1.

In step 286, the evaluation routine determines whether counterfeit suspect testing (CFS) is enabled. If CFS detection is enabled, then the control procedure proceeds to step 288. In step 288, the average magnetic test value determined in step 274 is compared to a predetermined threshold value. If the average magnetic test value does not exceed the predetermined threshold, the user is provided with an indication of a counterfeit suspect error in step 290 and the motor is halted. Since the document transport mechanism cannot be instantaneously stopped, both the counterfeit suspect and the next document in the input stack, if any, are delivered to the stacker as the motor is halted in step 290. The control procedure then passes to step 291 in which normal operation is resumed by removal of the counterfeit suspect and the next document from the stacker, placing the next document back into the hopper, and pressing the CONT key. After the CONT key is pressed in step 291, the control procedure returns to step 228 of FIG. 7A as indicated by continuation label A and thus bypasses counting either the counterfeit suspect or the subsequent document delivered to the stacker plate.

If in step 286 it was found that CFS detection was disabled or if, in step 288, the CFS threshold was exceeded, then the control procedure proceeds to step 292.

In step 292, the run count and the stacker count are incremented. The stacker count is used to ensure that the capacity of the stacker is not exceeded. The stacker count is reset whenever the stacked documents are removed from the stacker. The run count is the number of documents that have been detected since the most recent execution of step 226 of FIG. 7A.

Proceeding from step 292 to step 294, a branch is made to step 296 if the apparatus is set to run in batch mode. If, in step 296, the count of documents has reached the specified batch size, then the user is provided with an indication of a complete batch in step 298. Since the imminent completion of the batch had been detected in step 233, by the time that step 298 is reached, the motor has sufficiently slowed so that the present document is the final document delivered to the stacker plate. From step 298, the control procedure continues to step 271 and waits for removal of the batch from the stacker plate.

If, in step 294, the apparatus was determined not to be operating in batch mode or if, in step 296, batch completion was not detected, then the control procedure passes to step 295 wherein the stacker count is tested to determine whether the stacker plate is filled to its capacity. If the stacker plate is not determined in step 295 to be full, then the control procedure returns to step 228 in order to prepare to accumulate data for the next document. If the stacker plate is full, the control procedure passes to step 297 wherein an appropriate indication is made that the stacker is full. From step 297, the control procedure passes to step 271 and awaits removal of documents from the stacker.

Step 271 is reached whenever a batch is completed, the stacker is full, or an error other than a counterfeit suspect has been detected. During step 271, the user (or the controlling host) is informed of the status of the apparatus. In order to clear the error or to otherwise resume counting, the documents must be removed from the stacker. In contrast to the detection of counterfeit suspects, the detection of other errors also causes uncertainty in the count. For example, if step 271 has been reached as the result of a double error, the operator cannot be certain whether to remove two or three documents from the hopper in order to resume normal counting. The double error may have been generated by the simultaneous passage of two documents or by the passage of a single document of unusual opacity. In order to avoid corruption of the integrity of the accumulated counts and totals, detection of errors other than counterfeit suspect errors causes the run count to be reset and the operator must remove all of the documents from the stacker plate at step 271 and either return them to the hopper or terminate counting. Similarly, the other two conditions which may lead to step 271—completion of a batch or a full stacker—require removal of all of the documents from the stacker plate. When the stacker photosensor indicates that the documents have been removed from the stacker plate, operation resumes and the control procedure passes to step 273.

Step 273 is a procedure to ensure that the document counter is not left in a "hidden document" condition. A hidden document is a document which may have been the last document in the hopper and was fed from the hopper but not delivered to the stacker during the motor halting operation which preceded step 271. Since such a document would not be visible to the operator, and there would be no other documents remaining in the hopper, a test is made in step 273 to determine whether the hopper is empty as determined by the hopper photosensor. If the hopper is empty, then the motor is restarted and allowed to run for one idle timeout interval so that any hidden document will be delivered to the stacker plate. Then, in step 275, the stacker plate count is reset since all documents have been removed from the stacker plate, and the control procedure returns to step 226.

Portions of the foregoing control procedure relative to the detection of counterfeit suspect documents can be modified in order to carry out the alternative method for detecting counterfeit suspect documents which was mentioned in connection with the signal conditioning circuit 110a. In the modified arrangement for the control procedure for practicing the alternative method, the CPU accumulates (i) a first count of consecutive sampled values of the conditioned magnetic detection signal that exceed a first predetermined reference value and (ii) a second count of sampled values that exceed a second predetermined reference value. These first and second accumulated counts are each compared with one or more reference values associated with a genuine document in order to verify each document. Specifically, the alternative procedure utilizes counting registers for accumulating the count and a flag register for indicating whether a document has passed or failed the verification comparison. These registers are initially cleared prior to the detection interval in steps 228 and 230 of the control procedure.

Figure 7D:
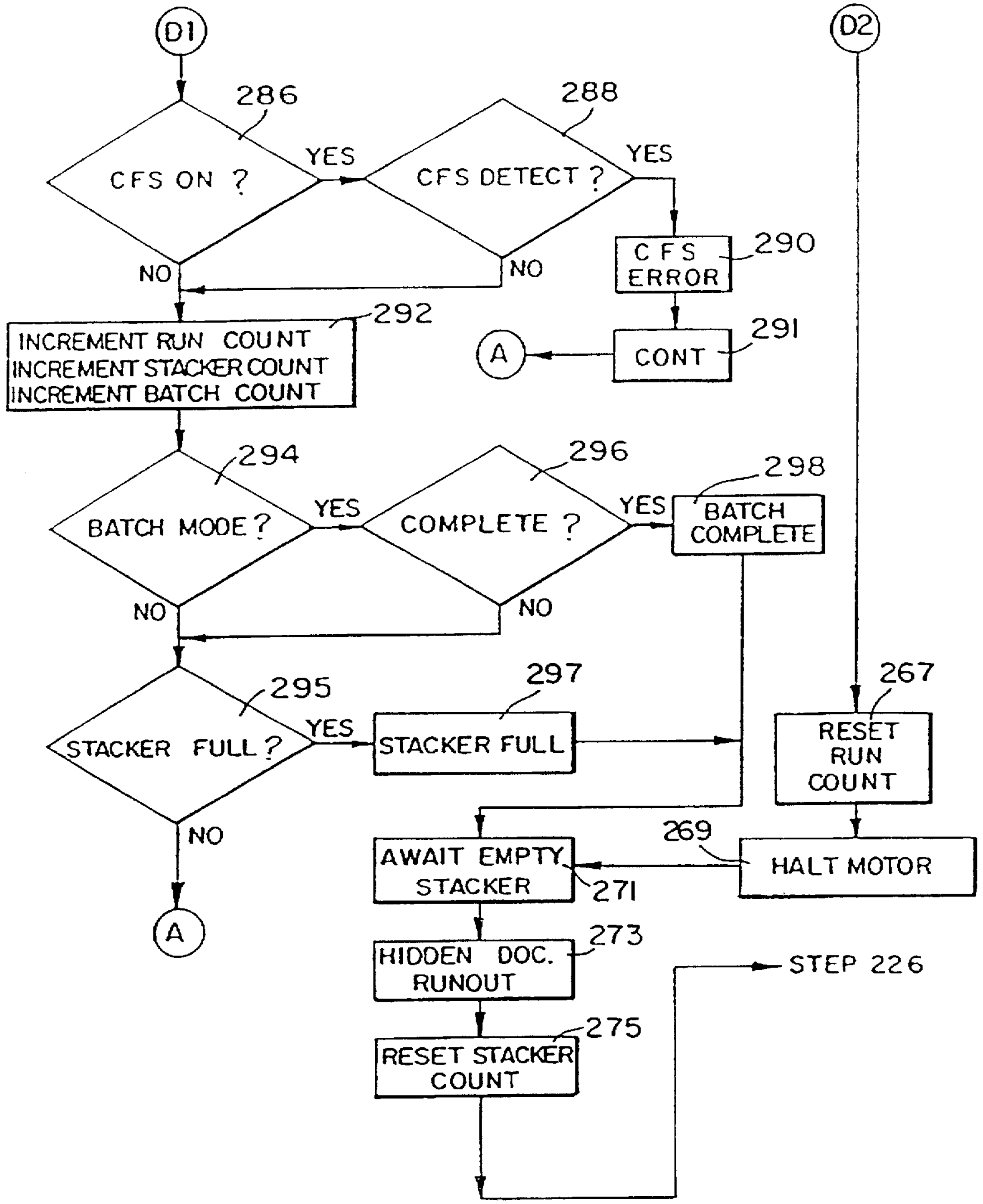
Figure 7E:
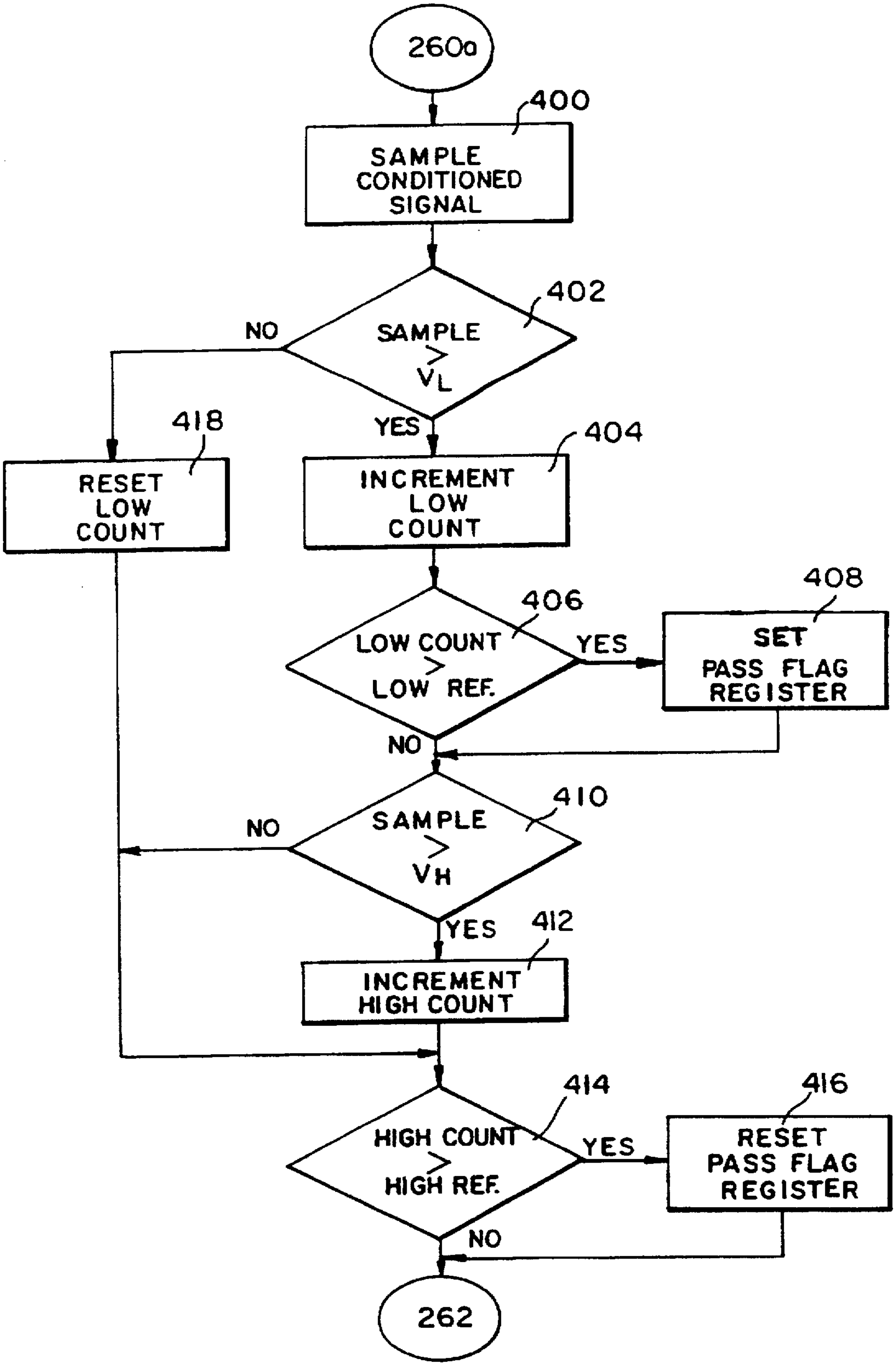

In the alternative document verification method, step 260 of the control procedure in FIG. 7B is replaced by a procedure shown in FIG. 7E and labeled 260a.

Referring now to FIG. 7E, the A/D converter is operated by the controller in step 400 to obtain a sampled value of the conditioned signal from the conditioning circuit 110a. Then, in step 402, the controller compares the sampled value obtained in step 400 with a predetermined reference value, $V_L$, representing a minimum threshold value. If the sampled value does not exceed $V_L$, then the control procedure branches to step 418, wherein the counting register that is used to count the consecutive samples above $V_L$ is reset. The controller then proceeds to step 414, which is explained later herein.

If, in step 402, the sampled value is determined to exceed $V_L$, then the controller proceeds to step 404. In step 404, the counting register for maintaining the count of consecutive samples exceeding $V_L$ is incremented. This register is hereinafter referred to as the "low count" register. Then, the controller proceeds to step 406.

In step 406 the value contained within the low count register is compared to a predetermined reference value corresponding to the minimum number of consecutive samples in excess of $V_L$ that are required in order to identify a document as genuine. If the accumulated value of the low count register exceeds the predetermined reference value, then the control procedure proceeds to step 408, wherein a flag register is set to indicate that the requisite minimum counting value has been exceeded and that the verification test has been passed by the document relative to the value of the low count register. The controller then proceeds to step 410.

If, in step 406, the value of the low count register does not exceed the requisite minimum, then the controller proceeds to step 410.

In step 410, the sampled value obtained in step 400 is compared with a predetermined limit value, $V_H$. If the sampled value is found to exceed $V_H$, then the controller proceeds to step 412, wherein another register, the "high count" register is incremented. The controller then proceeds to step 414.

If, in step 410, the sampled value is not found to exceed $V_H$, then the controller proceeds to step 414.

In step 414, the value accumulated within the high count register is compared with a predetermined reference or maximum value above which a document is to be identified as a counterfeit suspect document. If the contents of the high count register are determined to exceed the predetermined maximum value, then the controller proceeds to step 416, wherein the pass flag register is set to indicate a counterfeit suspect document. The controller then proceeds to step 262 of the control procedure shown in FIG. 7B. If, in step 414, the value accumulated within the high count register does not exceed the predetermined maximum value, then the controller proceeds from step 414 to step 262 of FIG. 7B, and execution continues as previously described herein.

As can be appreciated relative to the procedure shown in FIG. 7E, the pass flag register indicates successful verification of a genuine document. If the pass flag register is not set, then such condition indicates that the document is a counterfeit suspect document. A counterfeit document is indicated if an insufficient number of consecutive sampled values were above the low threshold $V_L$ or if a predetermined number of sampled values were above the high limit value, $V_H$, during the document detection interval. It is noted that these two criteria can be implemented in a combined manner as has been described or, alternatively, either of the two verification criteria can be used singly, if desired.

In the practice of the alternative document verification method, it is noted that the counterfeit document detection step 288 described in connection with FIG. 7D is modified to consist essentially of determining whether the pass flag indicates detection of a counterfeit suspect document.

From the foregoing disclosure and the accompanying drawings, it can be seen that the present invention provides certain novel and useful features that will be apparent to those skilled in the pertinent art. In particular, there has been described an improved document counting and batching apparatus wherein optical and magnetic verification tests are conducted according to programmable digital thresholding of sensor signals and wherein reliability is enhanced by reducing the influence of electrical noise upon sensor signals.

The terms and expressions which have been employed are used as terms of description and not of limitation and there is no intention in the use of such terms and expressions of excluding any equivalents of the features and elements shown and described, or portions thereof, but it is recognized that various modifications are possible within the scope and spirit of the invention as claimed.

What is claimed is:

1. An apparatus for examining documents having a magnetic property with respect to authenticity, comprising:

a document guide path for guiding a document in the apparatus;

a magnetic transducer mounted along the document guide path for detecting a magnetic property of the documents moving along said document guide path, said magnetic transducer producing a transducer signal indicative of the magnetic property of the document when the magnetic property of the document is detected by said magnetic transducer;

digital conversion means responsive to the signal from the magnetic transducer for producing representative proportional digital values indicative of the transducer signal;

accumulating means for generating an accumulated numerical value based on the digital values from the digital conversion means;

a digital memory for storing predetermined numerical values, each value pertaining to a cumulative magnetic property of an authentic document; and comparison means connected with the memory and responsive to said accumulated numerical value for comparing said accumulated numerical value with at least one of the predetermined numerical values indicative of the magnetic property of an authentic document, whereby the document having an acceptable magnetic property is determined after the document has moved along the guide path past the magnetic transducer.

2. The apparatus of claim 1 wherein said accumulating means comprises first counting means for providing a first accumulated value as a count of the proportional digital values exceeding a first predetermined reference value.

3. The apparatus of claim 1 wherein said comparison means comprises means for comparing said accumulated value with at least two predetermined values defining a predetermined range of values indicative of an authentic document.

4. The apparatus of claim 1 further comprising magnetizing means mounted in a rigid relationship with said magnetic transducer for magnetizing the document, and constricting means for constricting the document guide path in the vicinity of said magnetic transducer, such that the magnetic property of any document passing said magnetic transducer is uniformly detected.

5. The apparatus of claim 4 wherein said constricting means comprises a rotatable roller.

6. An apparatus for examining documents having a magnetic property with respect to authenticity, comprising;

a document guide path for guiding a document in the apparatus;

a magnetic transducer mounted along the document guide path for detecting a magnetic property of the documents moving along said document guide path, said magnetic transducer producing a transducer signal indicative of the magnetic property of the document when the magnetic property of the document is detected by said magnetic transducer:

digital conversion means responsive to the signal from the magnetic transducer for producing representative digital values indicative of the transducer signal:

accumulating means for generating an accumulated value based on the digital values from the digital conversion means: and comparison means responsive to said accumulated value for comparing said accumulated value with a predetermined value indicative of the magnetic property of an authentic document, whereby the document having an acceptable magnetic property can be determined wherein said accumulating means comprises first counting means for providing a first accumulated value as a count of digital values exceeding a first predetermined reference value, and second counting means for providing a second accumulated value as a count of digital values exceeding a second predetermined reference value.

7. The apparatus of claim 6 wherein said comparison means comprises:

first comparing means for comparing said first accumulated value to a first predetermined reference value associated with a document having an authentic magnetic property;

second comparing means for comparing said second accumulated value with a second predetermined reference value associated with a document having an authentic magnetic property; and indicating means for indicating whether the document is a counterfeit suspect document in response to said first and second comparing means.

8. The apparatus of claim 6 further comprising magnetizing means for magnetizing the document.

9. The apparatus of claim 8 wherein said magnetizing means is mounted in a rigid relationship with said magnetic transducer.

10. The apparatus of claim 6 further including a signal conditioning circuit responsive to said magnetic transducer signal for providing a conditioned signal to the digital conversion means.

11. The apparatus of claim 10 wherein said signal conditioning circuit comprises:

an amplifier for amplifying said signal from the magnetic transducer and producing a first amplified signal; and a filter for filtering said first amplified signal and producing a filtered signal.

12. The apparatus of claim 11 wherein said signal conditioning circuit further comprises:

a rectifier means for rectifying said first amplified signal and providing a rectified signal to said filter; and limiting means connecting said filter to said digital conversion means, for limiting the amplitude of said filtered signal to a range compatible with said digital conversion means to provide a proportional response therefrom.

13. The apparatus of claim 10 wherein said signal conditioning circuit comprises an integrator for producing an integrated signal in response to said signal from the magnetic transducer.

14. The apparatus of claim 13 wherein said integrator is an analog integrator having a time constant that is less than a period of time required for the document to move along the guide path past the magnetic transducer, and wherein said digital conversion means is connected to receive the integrated signal.

15. The apparatus of claim 14 comprising document transport means for moving documents along the guide path at a selectable rate of at least 600 documents per minute.

16. The apparatus of claim 15 wherein said comparison means is configured to select the predetermined numerical value from the memory according to the selected rate of operation.

17. A method of examining documents having a magnetic property with respect to authenticity, comprising the steps of;

transporting a document along a guide path:

detecting a magnetic property of the document during said transporting step:

producing a detection signal indicative of said magnetic property of the document detected in said detecting step:

sampling said detection signal and producing sampled values;

accumulating the sampled values to produce at least one cumulative value, and comparing said cumulative value with a predetermined value indicative of the magnetic property of an authentic document, whereby a document having an acceptable magnetic property can be determined:

wherein said accumulating step comprises accumulating a first cumulative value as a count of consecutive sampled values exceeding said predetermined threshold value.

18. The method of claim 17 wherein said accumulating step comprises accumulating a second cumulative value as a count of sampled values exceeding a predetermined limit value.

19. The method of claim 18 wherein said comparing step comprises:

comparing said first cumulative value to a predetermined minimum value associated with a document having an authentic magnetic property;

comparing said second cumulative value with a predetermined maximum value associated with a document having an authentic magnetic property; and indicating when the document is in the condition that its magnetic property has a value indicative of an authentic document in response to the comparisons.

20. An apparatus for examining documents having a magnetic property with respect to authenticity, comprising:

a document guide path for guiding a document in the apparatus;

document transport means for moving documents along the guide path at a selectable rate of at least 600 documents per minute;

a magnetic transducer mounted along the document guide path for detecting a magnetic Property of the documents moving along said document guide path, said magnetic transducer producing a transducer signal indicative of the magnetic property of the document when the magnetic Property of the document is detected by said magnetic transducer;

digital conversion means responsive to the signal from the magnetic transducer for producing representative proportional digital values indicative of the transducer signal;

a signal conditioning circuit responsive to said magnetic transducer signal for providing a conditioned signal to the digital conversion means, the signal conditioning circuit comprising an analog integrator having a time constant that is less than a period of time required for the document to move along the guide path past the magnetic transducer, and wherein said digital conversion means is connected to receive the integrated signal;

accumulating means for generating an accumulated numerical value based on the digital values from the digital conversion means;

a replaceable non-volatile digital memory for storing predetermined numerical values, each value pertaining to a cumulative magnetic property of an authentic document; and comparison means connected with the memory and responsive to said accumulated numerical value for comparing said accumulated numerical value with at least one of the predetermined numerical values indicative of the magnetic Property of an authentic document, whereby the document having an acceptable magnetic property is determined after the document has moved along the guide path past the magnetic transducer, wherein said comparison means is configured to select the predetermined numerical value from the memory according to the selected rate of operation.

21. An apparatus for examining documents having a magnetic Property with respect to authenticity, comprising:

a document guide path for guiding a document in the apparatus;

a magnetic transducer mounted along the document guide path for detecting a magnetic property of the documents moving alone said document guide path, said magnetic transducer producing a transducer signal indicative of the magnetic property of the document when the magnetic property of the document is detected by said magnetic transducer;

digital conversion means responsive to the signal from the magnetic transducer for producing representative proportional digital values indicative of the transducer signal;

accumulating means for generating an accumulated numerical value based on the digital values from the digital conversion means;

a replaceable non-volatile digital memory for storing predetermined numerical values, each value pertaining to a cumulative magnetic Property of an authentic document; and comparison means connected with the memory and responsive to said accumulated numerical value for comparing said accumulated numerical value with at least one of the predetermined numerical values indicative of the magnetic property of an authentic document, whereby the document having an acceptable magnetic property is determined after the document has moved along the guide path past the magnetic transducer.

* * * * *